United States Patent
Maker et al.

(10) Patent No.: US 10,556,179 B2
(45) Date of Patent: Feb. 11, 2020

(54) VIDEO GAME AUDIO CONTROLLER

(71) Applicant: Performance Designed Products LLC, San Diego, CA (US)

(72) Inventors: Ozhan Maker, San Diego, CA (US); Kevin Zuccaro, San Diego, CA (US); Trevor Lehr, Alpine, CA (US)

(73) Assignee: Performance Designed Products LLC, San Diego, CA (US)

( * ) Notice: Subject to any disclaimer, the term of this patent is extended or adjusted under 35 U.S.C. 154(b) by 203 days.

(21) Appl. No.: 15/724,887

(22) Filed: Oct. 4, 2017

(65) Prior Publication Data
US 2018/0353856 A1    Dec. 13, 2018

Related U.S. Application Data

(60) Provisional application No. 62/517,806, filed on Jun. 9, 2017.

(51) Int. Cl.
| | |
|---|---|
| *A63F 13/87* | (2014.01) |
| *A63F 13/54* | (2014.01) |
| *G06F 3/16* | (2006.01) |
| *H04R 1/10* | (2006.01) |
| *A63F 13/25* | (2014.01) |

(52) U.S. Cl.
CPC ............. *A63F 13/54* (2014.09); *A63F 13/25* (2014.09); *G06F 3/165* (2013.01); *H04R 1/1041* (2013.01)

(58) Field of Classification Search
CPC ........... A63F 13/98; A63F 13/87; G06F 3/165
See application file for complete search history.

(56) References Cited

U.S. PATENT DOCUMENTS

| | | |
|---|---|---|
| 1,127,161 A | 2/1915 | Baldwin |
| 2,782,423 A | 2/1957 | Eli et al. |
| 4,270,025 A | 5/1981 | Alsup et al. |
| 4,302,635 A | 11/1981 | Jacobsen et al. |
| 4,472,607 A | 9/1984 | Houng |

(Continued)

FOREIGN PATENT DOCUMENTS

| | | |
|---|---|---|
| EP | 1638364 | 3/2006 |
| WO | WO 03/103255 | 12/2003 |

OTHER PUBLICATIONS

HDMI, 1/11/117, pp. 1-15, https://en.wikipedia.org/w/index.php?title=HDMI&oldid=759408160 (Year: 2017).*

*Primary Examiner* — Omkar A Deodhar
*Assistant Examiner* — Ross A Williams
(74) *Attorney, Agent, or Firm* — Knobbe, Martens, Olson & Bear LLP

(57) ABSTRACT

A video game audio controller includes a headset audio port configured to connect to an audio headset and receive a headset audio signal, a chat audio port configured to receive a chat audio signal from another controller, a game audio port configured to receive a game audio signal from a video game console, and control circuitry configured to sum the headset audio signal and the chat audio signal and to output the combined chat audio signal from the controller. A local chat audio gaming network can include a plurality of such video game audio controllers removably connectable with each other via one or more cables, wherein the combined chat audio signal is communicated in only one direction between the plurality of video game audio controllers.

18 Claims, 27 Drawing Sheets

(56) References Cited

U.S. PATENT DOCUMENTS

| | | |
|---|---|---|
| 4,554,993 A | 11/1985 | Houng |
| 4,588,868 A | 5/1986 | Bertagna et al. |
| 4,829,571 A | 5/1989 | Kakiuchi et al. |
| 4,965,836 A | 10/1990 | Andre et al. |
| 5,018,599 A | 5/1991 | Dohl et al. |
| 5,035,005 A | 7/1991 | Hung |
| 5,579,430 A | 11/1996 | Grill et al. |
| 5,685,775 A | 11/1997 | Bakoglu et al. |
| 5,793,878 A | 8/1998 | Chang |
| 6,016,347 A | 1/2000 | Magnasco et al. |
| 6,069,964 A | 5/2000 | Yang |
| 6,097,809 A | 8/2000 | Lucey et al. |
| 6,183,367 B1 | 2/2001 | Kaji et al. |
| 6,241,612 B1 | 6/2001 | Heredia |
| 6,295,366 B1 | 9/2001 | Haller et al. |
| 6,466,681 B1 | 9/2002 | Siska, Jr. et al. |
| 6,599,194 B1 | 7/2003 | Smith et al. |
| 6,618,714 B1 | 9/2003 | Abrahams |
| 6,658,130 B2 | 12/2003 | Huang |
| 6,731,771 B2 | 5/2004 | Cottrell |
| 6,775,390 B1 | 8/2004 | Schmidt et al. |
| 6,868,164 B2 | 3/2005 | Ito et al. |
| 7,082,393 B2 | 7/2006 | Lahr |
| 7,090,582 B2 | 8/2006 | Danieli et al. |
| 7,181,037 B2 | 2/2007 | Birch |
| 7,371,175 B2 | 5/2008 | Gilboy et al. |
| 7,458,894 B2 | 12/2008 | Danieli et al. |
| 8,123,618 B2 | 2/2012 | Karmarkar |
| 8,475,279 B2 | 7/2013 | Danieli et al. |
| 8,571,695 B2 | 10/2013 | Reiss et al. |
| 9,415,308 B1 | 8/2016 | Zepp et al. |
| 2002/0110246 A1 | 8/2002 | Gosior et al. |
| 2002/0131616 A1 | 9/2002 | Bronnikov et al. |
| 2002/0196960 A1 | 12/2002 | Pham et al. |
| 2004/0132509 A1 | 7/2004 | Glezerman |
| 2004/0213427 A1 | 10/2004 | Yoon |
| 2005/0003892 A1 | 1/2005 | Cheng et al. |
| 2005/0007500 A1 | 1/2005 | Lin et al. |
| 2005/0181872 A1 | 8/2005 | Acharya et al. |
| 2005/0239546 A1 | 10/2005 | Hedrick |
| 2006/0062417 A1 | 3/2006 | Tachikawa |
| 2006/0256992 A1 | 11/2006 | Liao |
| 2007/0064969 A1 | 3/2007 | Chou |
| 2007/0093279 A1 | 4/2007 | Janik |
| 2007/0183616 A1 | 8/2007 | Wahl et al. |
| 2007/0261153 A1 | 11/2007 | Wise et al. |
| 2008/0152160 A1 | 8/2008 | Chew et al. |
| 2008/0311986 A1 | 12/2008 | Reiss et al. |
| 2009/0252355 A1 | 10/2009 | Mao |
| 2010/0131269 A1 | 5/2010 | Park |
| 2014/0259568 A1* | 9/2014 | Trotsky ............ B25B 5/006 24/523 |

\* cited by examiner

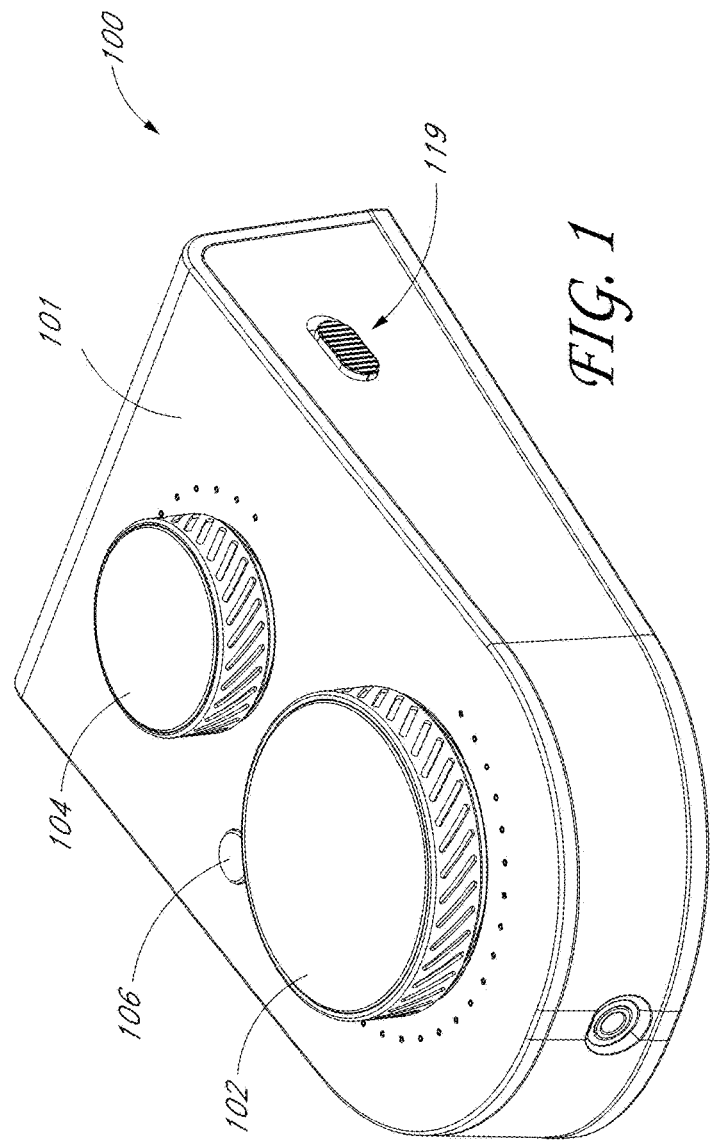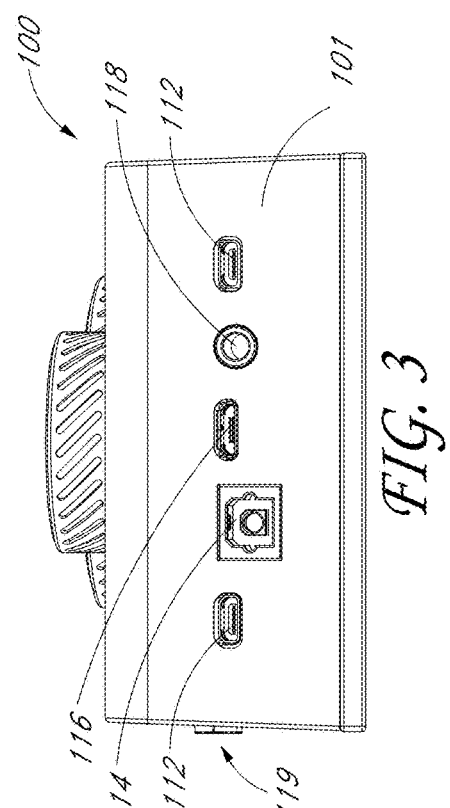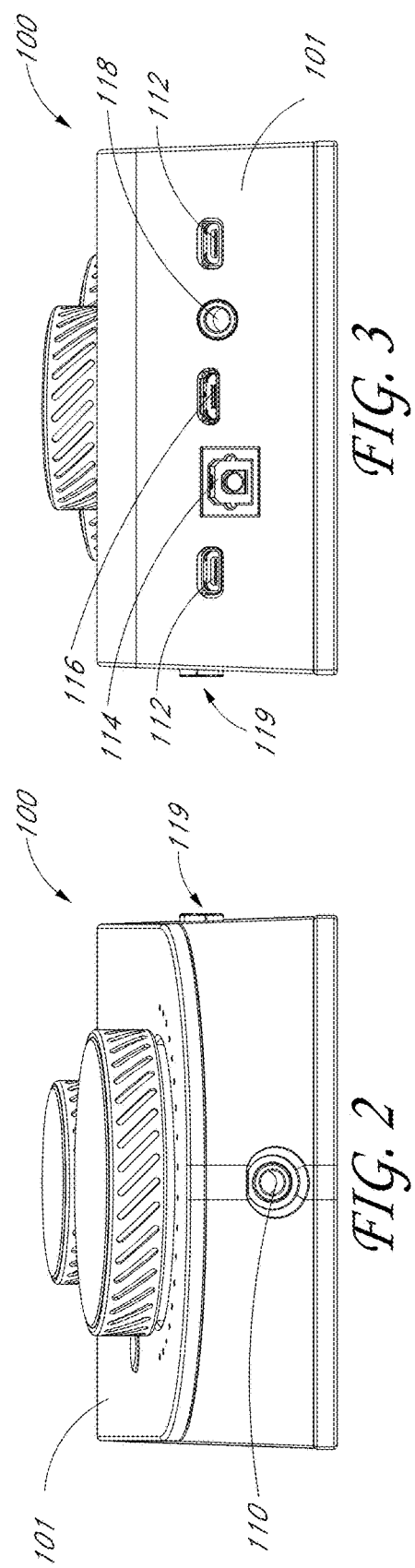

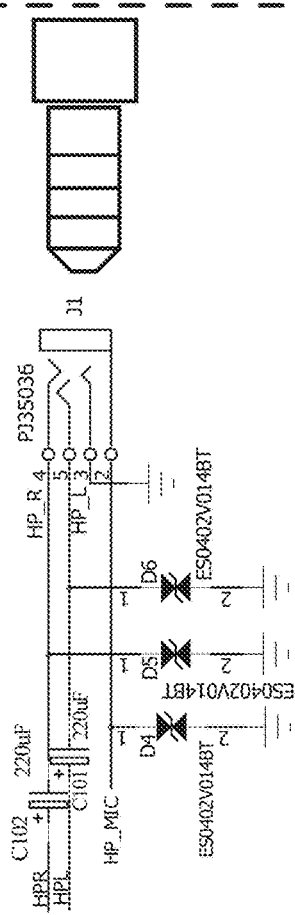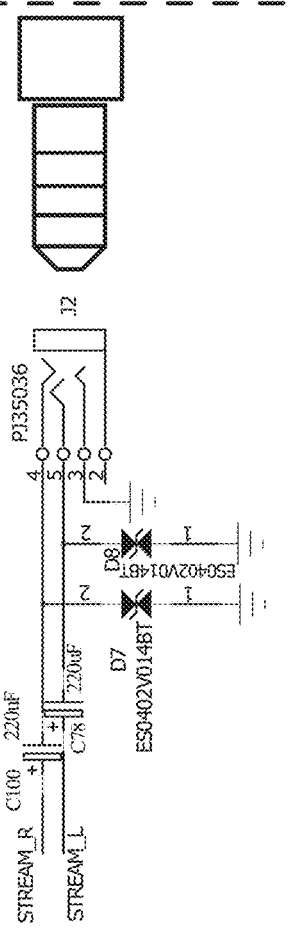
FIG. 13 Continued

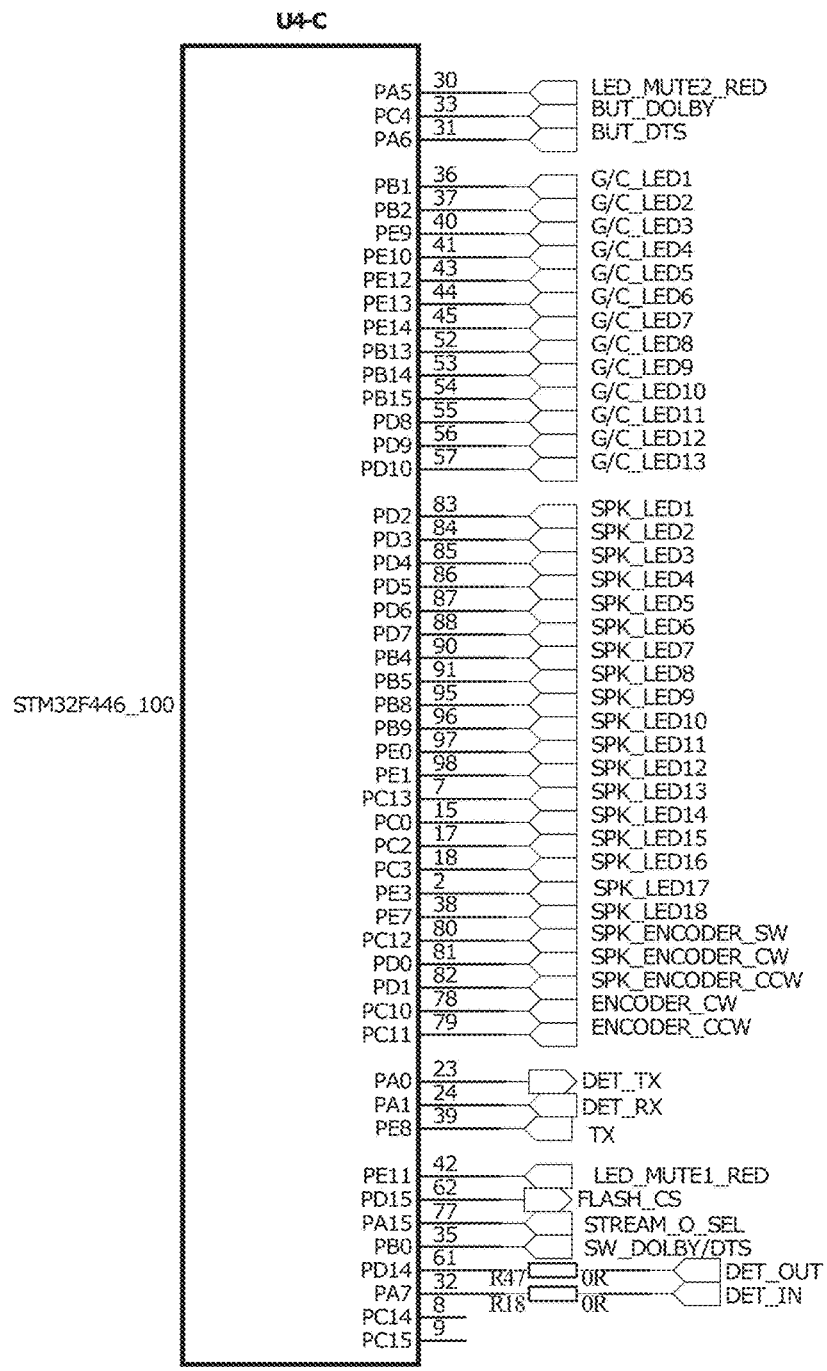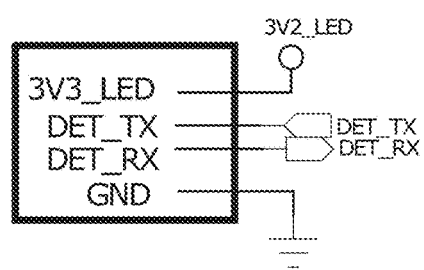
FIG. 14

VIDEO GAME AUDIO CONTROLLER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention is directed to a video game audio controller, and more particularly to a gaming audio controller that can be used in gaming tournaments for multiple players to hear both game audio and chat audio from their team members.

Description of the Related Art

Video gaming is very popular and gaming tournaments are often held in which teams of players compete against each other. It is important for teams to be able to communicate with each other during a game while also being able to hear the game audio.

SUMMARY

There is a need for an improved video game audio controller (or "gaming audio controller") that can allow multiple players to chat with each other as well as also hear the game audio.

In accordance with one aspect, a video game audio controller is provided. The video game audio controller includes a headset audio port configured to connect to an audio headset and receive a headset audio signal, a chat audio port configured to receive a chat audio signal from another controller, a game audio port configured to receive a game audio signal from a video game console, and control circuitry configured to sum the headset audio signal and the chat audio signal to provide a combined voice audio signal, and to output the combined voice audio signal from the controller.

In accordance with another aspect, a local chat audio gaming network can include a plurality of such video game audio controllers removably connectable with each other via one or more cables. The control circuitry of each video game audio controller is configured to communicate the combined voice audio signal to adjacent video game audio controllers.

In accordance with another aspect, a video game audio control system is provided. The system comprises a video game audio controller. The controller comprises a first port configured to connect to an audio headset and receive a headset audio signal therefrom. The controller also comprises a second port configured to operatively connect to a second video game audio controller and configured to receive a first chat audio signal and a first command signal from the second video game audio controller when connected thereto. The controller also comprises a third port configured to operatively connect to a third video game audio controller and configured to receive a second chat audio signal and a second command signal from the third video game audio controller when connected thereto. The controller also comprises a fourth port configured to operatively connect to a video game console and configured to receive a game audio signal from the video game console when connected thereto.

The controller also comprises control circuitry configured to detect the first command signal indicative of an operative connection with the second video game audio controller, and configured to detect the second command signal indicative of an operative connection with the third video game audio controller. The control circuitry is configured to actuate one or more electronic switches based on said detection of the command signals. The control circuitry is further configured to sum the headset audio signal and the first chat audio signal to provide a combined voice audio signal. The control circuitry is configured to communicate the combined voice audio signal to the third controller via the third port without said signal passing through the one or more electronic switches if the second command signal is detected by the control circuitry, and configured to not communicate the combined voice audio signal via the third port if the second command signal is not detected. The control circuitry is further configured to sum the headset audio signal and the second chat audio signal to provide a second combined voice audio signal. The control circuitry is configured to communicate the second combined voice audio signal to the second controller via the second port without said signal passing through the one or more electronic switches if the first command signal is detected by the control circuitry, and configured to not communicate the second combined voice audio signal via the second port if the first command signal is not detected.

In accordance with another aspect, a video game audio control system is provided. The system comprises a plurality of video game audio controllers removably connectable with each other in a chain via one or more interconnect cables to define a local chat audio network. Each of the video game audio controllers comprises a headset audio port configured to connect to an audio headset and receive a headset audio signal, a left chat audio port configured to receive a first chat audio signal and a first command signal from a previous video game controller in the chain when connected thereto, a right chat audio port configured to receive a second chat audio signal and a second command signal from a next video game controller in the chain when connected thereto, and a game audio port configured to operatively connect to a video game console and configured to receive a game audio signal from the video game console when connected thereto.

Each of the controllers also comprises control circuitry configured to detect the first command signal indicative of a connection with the previous video game audio controller, and configured to detect the second command signal indicative of a connection with the next video game audio controller. The control circuitry is configured to actuate one or more electronic switches based on said detection of the command signals. The control circuitry is further configured to sum the headset audio signal and the first chat audio signal to provide a first combined voice audio signal. The control circuitry communicates the first combined voice audio signal to the right chat audio port without said first combined voice audio signal passing through the one or more electronic switches if the second command signal is detected by the control circuitry indicating a connection with the next video game controller. The control circuitry is further configured to sum the headset audio signal and the second chat audio signal to provide a second combined voice audio signal. The control circuitry communicates the second combined voice audio signal to the left chat audio port without said second combined voice audio signal passing through the one or more electronic switches if the first command signal is detected by the control circuitry indicating a connection with the previous video game controller. The control circuitry communicates the first combined voice audio signal to the left port without said first combined voice audio signal passing through the one or more electronic switches if the second command signal is not detected by the control circuitry and the first command signal is detected by the control circuitry indicating a connection with the previous video game controller.

In accordance with another aspect, a video game audio control system is provided. The system comprises a plurality of video game audio controllers removably connectable with each other in a chain via one or more interconnect cables to define a local chat audio network. Each of the video game audio controllers is coupleable to a respective headset. A first video game audio controller is operable to receive a microphone signal from a microphone in the headset that is coupled to the first video game audio controller, receive a chat signal and a command signal from a previous video game audio controller in the chain, and sum the chat signal with the microphone signal to provide a combined audio signal.

The first video game audio controller is further operable to communicate via control circuitry in the first video game audio controller the combined audio signal to a next video game audio controller in the chain upon detection of a command signal from said next video game audio controller indicating a connection between the next video game audio controller and the first video game audio controller. The first video game audio controller is operable to sum the microphone signal and a chat signal from the next video game audio controller to provide a second combined audio signal, and to communicate the second combined voice audio signal to the previous video game audio controller upon detection of a command signal from said previous video game audio controller indicating a connection between the previous video game audio controller and the first video game audio controller. The first video game audio controller is further operable to sum the chat signal from the previous video game audio controller and the chat signal from the next video game audio controller to provide a combined chat audio signal and to communicate the combined chat audio signal to the headset.

BRIEF DESCRIPTION OF THE DRAWINGS

FIG. 1 is a perspective top view of one embodiment of a video game audio controller.

FIG. 2 is a front view of the video game audio controller of FIG. 1.

FIG. 3 is a rear view of the video game audio controller of FIG. 1.

DETAILED DESCRIPTION

Figure 5:
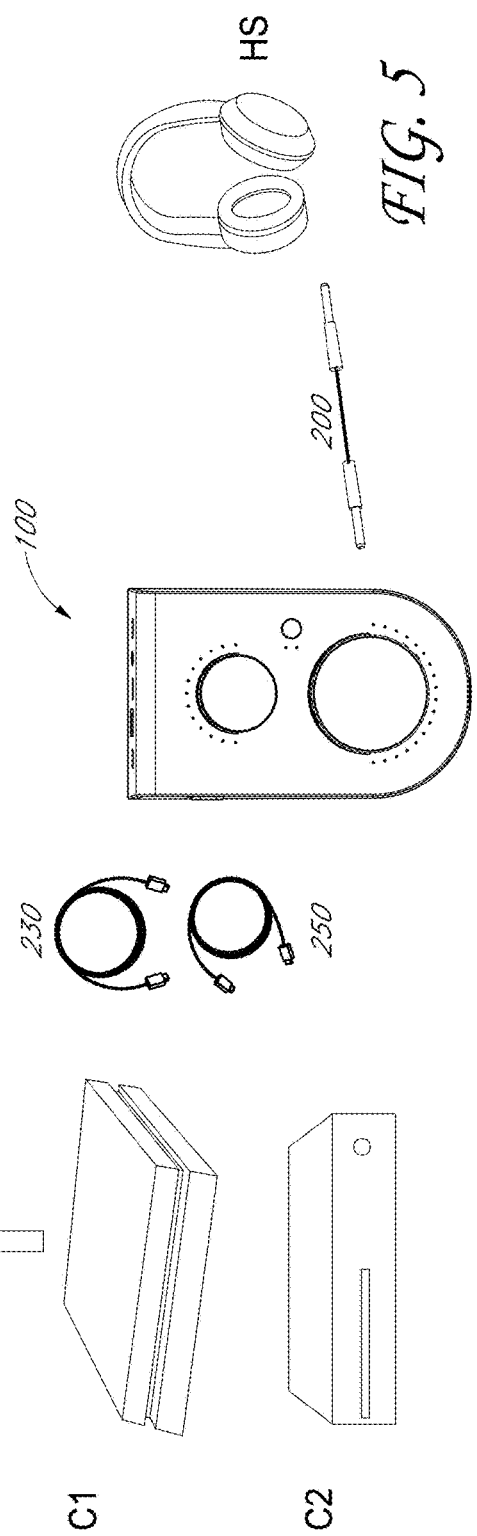
FIG. 5 is a schematic diagram illustrating the components used with the video game audio controller.

FIGS. 1-3 show one embodiment of a gaming audio controller 100 (the "controller"). The controller 100 can have a housing 101 that encloses electronics as further described below. The controller 100 can be removably connected between a game console (see C1, C2 in FIG. 7) and a user's headset (see HS in FIG. 5). Advantageously, the controller 100 is compatible for use with various different game consoles (e.g., PlayStation 4, Xbox One, etc.), different computers (e.g., PC, Mac computer), and mobile devices. FIGS. 17A-17E show a top, left, front, right and back view, respectively, of a video game audio controller, according to one embodiment.

The controller 100 can have a master volume control input 102 and a game/chat audio control input 104. Optionally, one or both of the master volume control input 102 and the game/chat audio control input 104 can be dials that can be rotated by a user to adjust the volume level and the balance between game and chat audio, respectively. In other embodiments, the master volume control input 102 and/or the game/chat audio control input 104 can have other suitable mechanisms, such as movable (e.g., pivotable, slidable) levers. The master volume control input 102 (e.g., a dial potentiometer) can be actuated (e.g., by the user) to increase the speaker volume (in the user's headset), such as by rotating a dial until the desired volume is reached. The game/chat audio control input 104 (e.g., a dial potentiometer) can be actuated (e.g., by the user) to vary (e.g., balance) how much game audio and how much chat audio the user will hear (e.g., in the ear cups of their headset); the more game audio is desired, the less chat audio will be heard and vice-versa.

The controller 100 can also have an input button 106 to selectively actuate a surround sound feature. Though not shown, the controller 100 optionally has a switch (e.g., toggle switch) actuatable to select the console type with which the controller 100 is used to ensure audio can be passed from the console to the controller 100.

Figure 4:
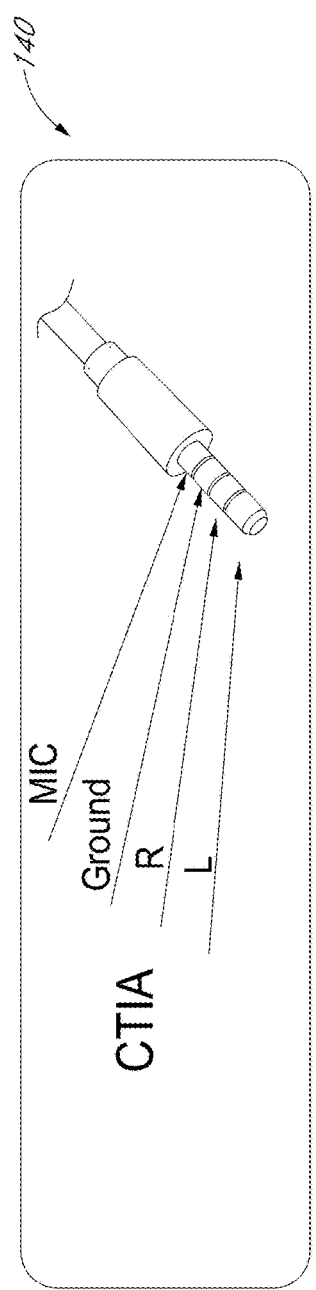
FIG. 4 is a perspective view of a headset audio connector.

With continued reference to FIGS. 1-3, the controller 100 includes several female connectors or ports, optionally including one or more of: a headset audio port 110, local chat network ports 112, an optical audio input port 114, a USB input port 116 and a streaming output port 118. The headset audio port 110 can receive a headset audio connector 140 (see FIG. 4) from a headset (not shown). As shown in FIG. 4, the headset audio connector 140 can optionally be a 3.5 mm 4-pole connector. The headset can optionally be a passive headset that includes a microphone (e.g., an inline mic). The local chat network ports 112 can be used to interconnect multiple controllers 100, as further discussed below, with interconnect cables 160 (e.g., 160A-160C in FIG. 6; 160A-160D in FIG. 7). The optical audio input port 114 can connect via an optical cable 230 (see FIG. 5) to the console C1, C2 to receive game audio from the console C1, C2. The USB input port 116 can connect via a USB cable 250 (see FIG. 5) to the console C1, C2, via which the controller 100 can receive power from the console C1, C2. Accordingly, the controller 100 does not require a separate power cord or connector. Additionally, the USB input port 116 can receive firmware updates via the USB cable 250. Optionally, the USB input port 116 also receives chat audio from the console C1, C2 when gaming outside the local network of the controller 100. The streaming output port 118 can connect to external devices via a cable to optionally output chat audio from the local network. For example, chat audio can be provided to judges, audience or fans via the streaming output port 118.

The controller 100 can optionally have a broadcast switch 119 operable by a user between two or more positions. Optionally, the broadcast switch 119 can be a slidable switch that can be slid between two or more positions. In one position, the broadcast switch 119 can enable streaming of chat audio mixed with game audio from the controller 100. In another position (e.g., a second position), the broadcast switch 119 can enable streaming of only chat audio (e.g., disallow streaming of game audio) from the controller 100. Optionally, the broadcast switch 119 can be operated into another position (e.g., a third position), to disallow streaming altogether from the controller 100. Though FIG. 1 shows the broadcast switch 119 as a slidable switch, one of skill in the art will recognize that the broadcast switch 119 can have other forms, such as a dial or a lever. In use, a user can connect a cable (e.g., a 3.5 mm cable) to the streaming out port 118 to stream out audio from the controller 100 (e.g., stream out game audio and chat audio if multiple controllers 100 are connected to each other and each controller is connected to a game console). The user can actuate the broadcast switch 119 to stream out game audio along with the combined chat audio from all the controller 100 that are connected together, or alternatively stream out only combined chat audio.

The controller 100 can be used in two modes: single player (e.g., home environment) mode and multi-player (e.g., tournament environment) mode. In single player mode, a single controller 100 would be connected to the console C1, C2 (e.g., via cables 230, 250) and to the user's headset HS. The user would receive chat audio (e.g., via the cable 250) and game audio (e.g., via the cable 230) from the console C1, C2. In this mode, the user can chat with others on-line via the console C1, C2, and can control the overall audio volume and the balance between game audio and chat audio as described above.

In multi-player mode, multiple controllers 100 are used, each connecting to the headset HS of one of the gamers. Game audio is received from the console C1, C2 by connecting the cable 250 to the optical audio input port 114 of one of the controllers 100. However, since there are multiple gamers connected via the multiple controllers 100, the controllers 100 are connected with interconnecting cables 160, as described further below, to form a local chat network. Advantageously, the interconnected controllers 100 substantially provide for direct, zero latency communication between gamers in the local chat network. In this mode, the chat does not come from the console C1, C2 via the USB input port 116, but rather from other players connected by the local chat network.

Figure 6:
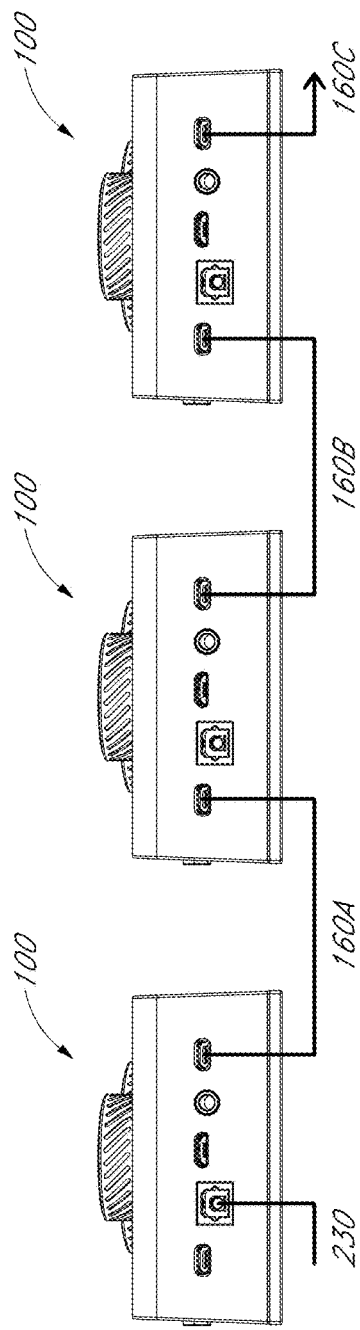
FIG. 6 is a schematic view of multiple video game audio controllers connected to each other.

FIG. 6 shows one embodiment of multiple controllers 100 connected to each other with interconnect cables 160A, 160B, 160C. In the illustrated embodiment, the optical cable 230 is connected to the optical audio input port 114 of one of the controllers 100, and chat audio is provided via the interconnect cables 160A, 160B, 160C as further described below.

Figure 7:
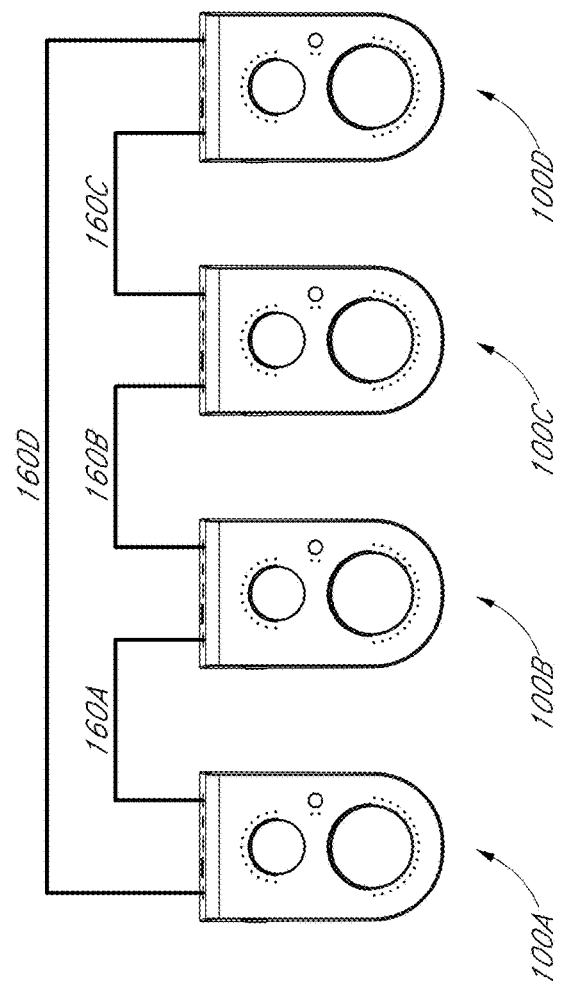
FIG. 7 is a schematic view of multiple video game audio controllers connected to each other in a loop.

FIG. 7 shows another arrangement of multiple controllers 100 connected to each other in a loop with interconnect cables 160A-160D to provide chat audio in a local chat network between the gamers connected to the controllers 100. In the illustrated embodiment, the chat audio flows between controllers, for example from controller 100A to controller 100B, from controller 100B to controller 100C, from controller 100C to controller 100D, and from controller 100D to controller 100A, or vice versa, with each of the controllers 100A-D summing only two audio input signals, namely the audio from the gamer's headset connected to the particular controller and the chat audio input signal from one other controller in the loop. In the illustrated embodiment, the controller 100D is connected to the controller 100A with an actual cable 160D. However, in another embodiment, described further below in connection with FIGS. 15A-15B, the controller 100D connects with the controller 100A via an internal line that runs through the interconnect cables 160A-160C. Optionally, the interconnect cables 160A-160C can be HDMI cables.

FIGS. 8-14 illustrate schematic diagrams of electronic circuitry of a video game audio controller, such as the video game audio controller 100 of FIG. 1, that perform at least some of the functions described herein. The following description and references are not meant to limit the scope of the disclosure. One of skill in the art will recognize from the disclosure hereinafter that alternative structures, devices and/or processes can be used in place of, or in combination with, the structures, devices and/or processes described below.

Figure 8:
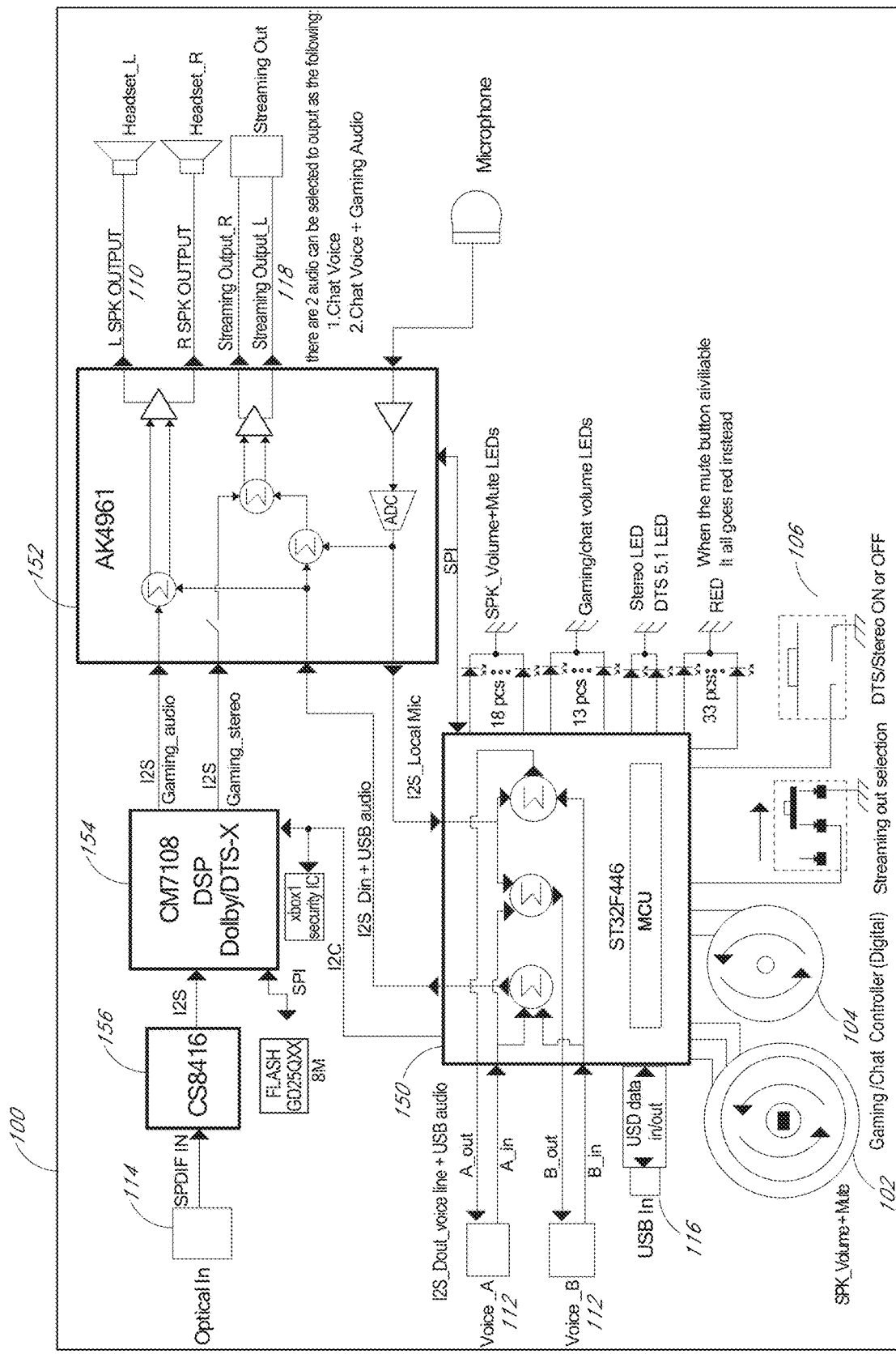
FIGS. 8-14 illustrate schematic diagrams of electronic circuitry of the video game audio controller of FIG. 1.

In particular, FIG. 8 illustrates a system block diagram for a video game audio controller, such as the video game audio controller 100. The controller 100, like any of the controllers described herein, will have a printed circuit board (PCB) and one or more of the following: audio amplifiers, an audio codec, a micro-controller unit (MCU), stand-alone sound card. For example, the controller 100 can have a microcontroller unit (MCU) 150 that receives the inputs described above, and provides outputs to the headset HS and other controllers 100. The MCU 150 is optionally model ST32F466 by ST Microelectronics. The controller 100 can include an audio CODEC 152. Optionally, the audio CODEC 152 has digital sound processing, such as model AK4961 by Asahi Kasei Microdevices Corporation. The controller 100 can also have an audio processor 154 and digital audio receiver 156.

The controller 100 receives an audio signal I2S_Local Mic from the headset HS, and receives a chat audio signal A_in from Voice_A or B_in from Voice_B from another controller that is electrically connected to the controller 100. The signals I2S_Local Mic and A_in or B_in are summed and output out of the controller 100 as signal B_out or A_out, which is communicated to another controller connected to the controller 100.

Figure 9:
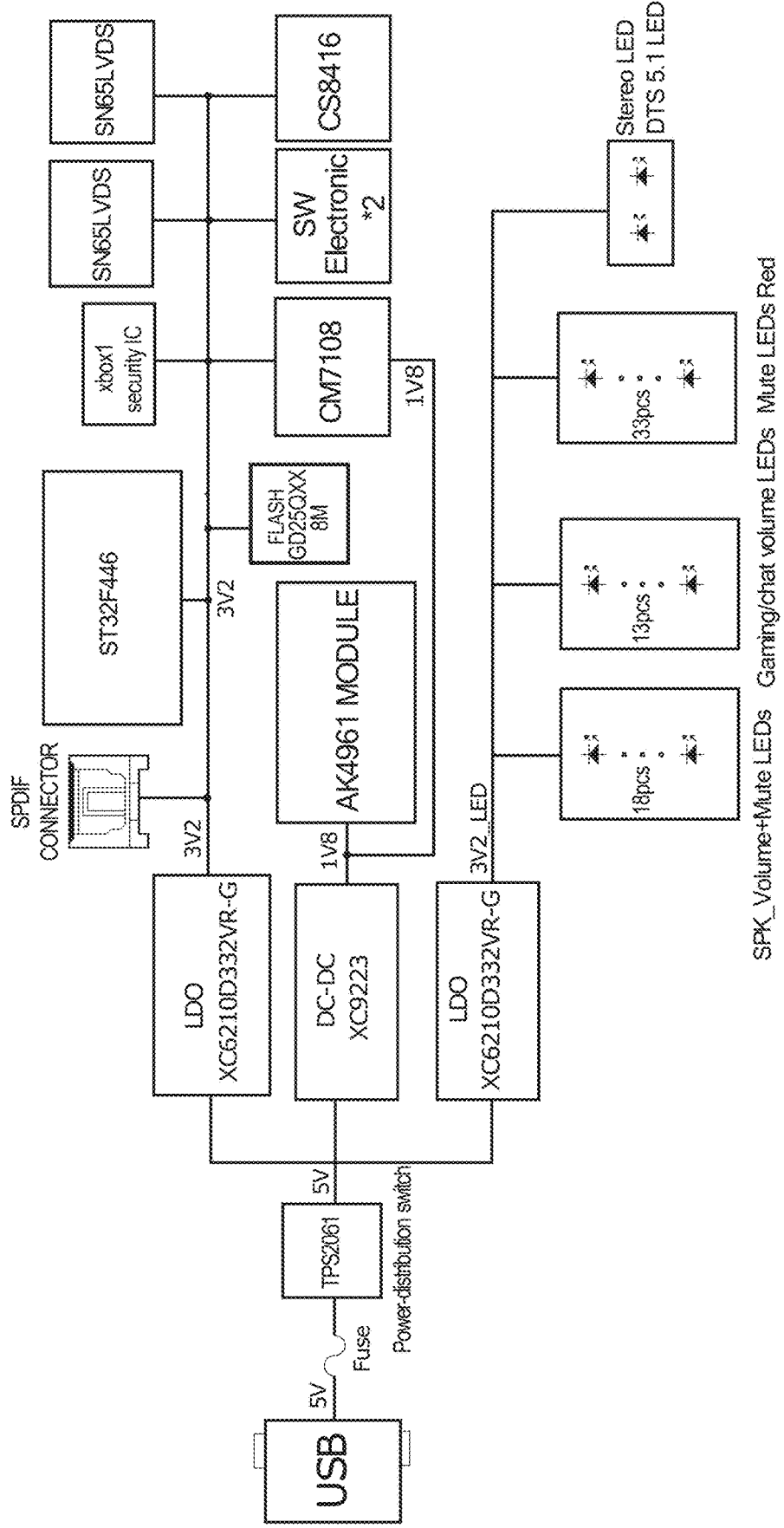
Figure 10:
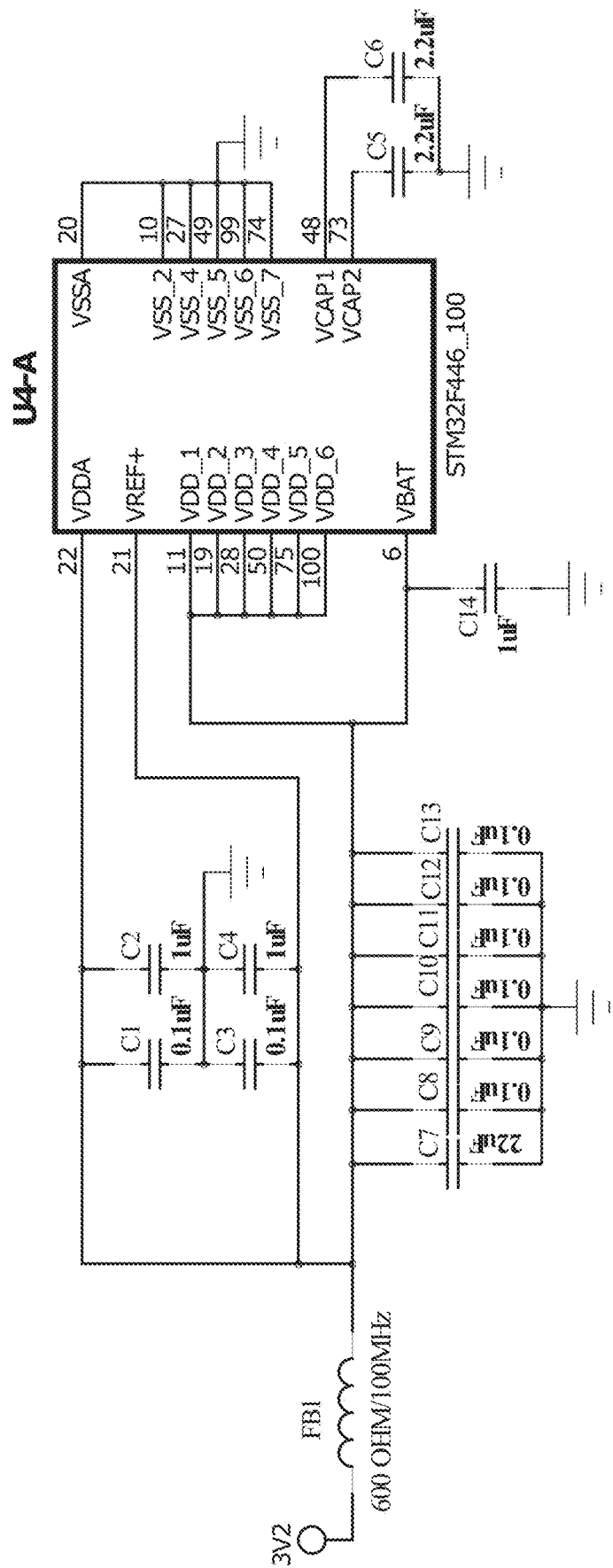
Figure 10:
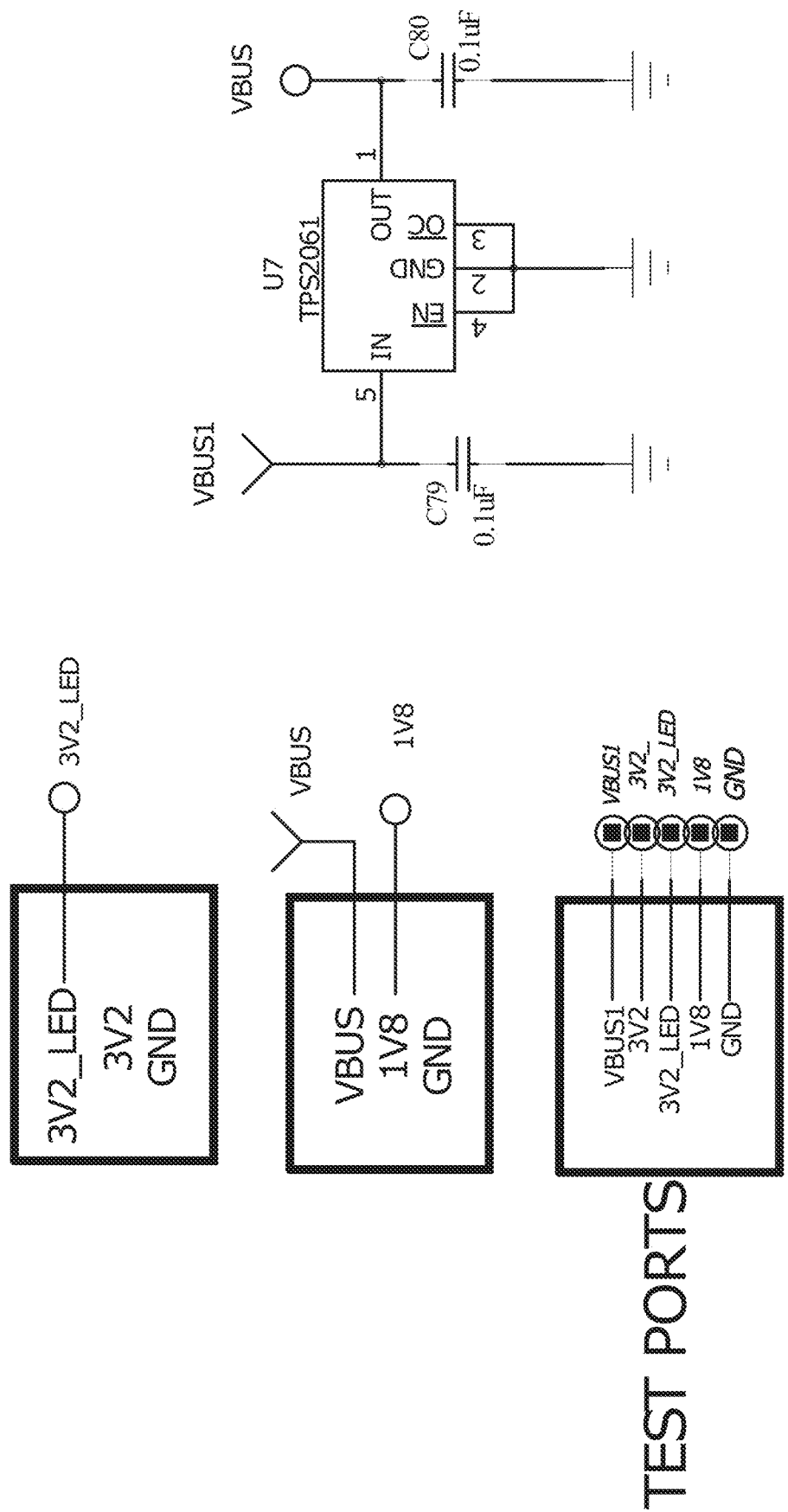
Figure 10:
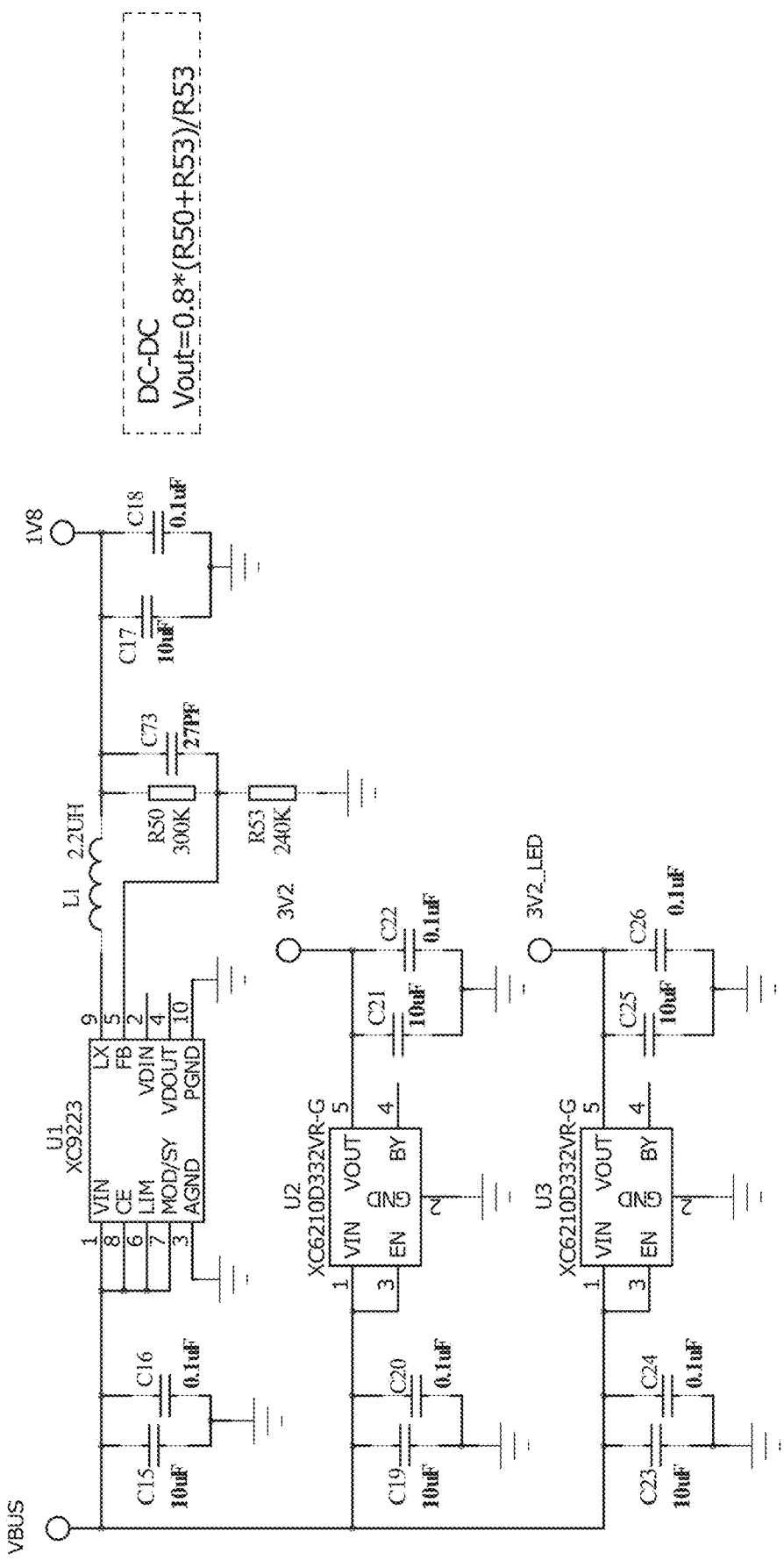
Figure 11:
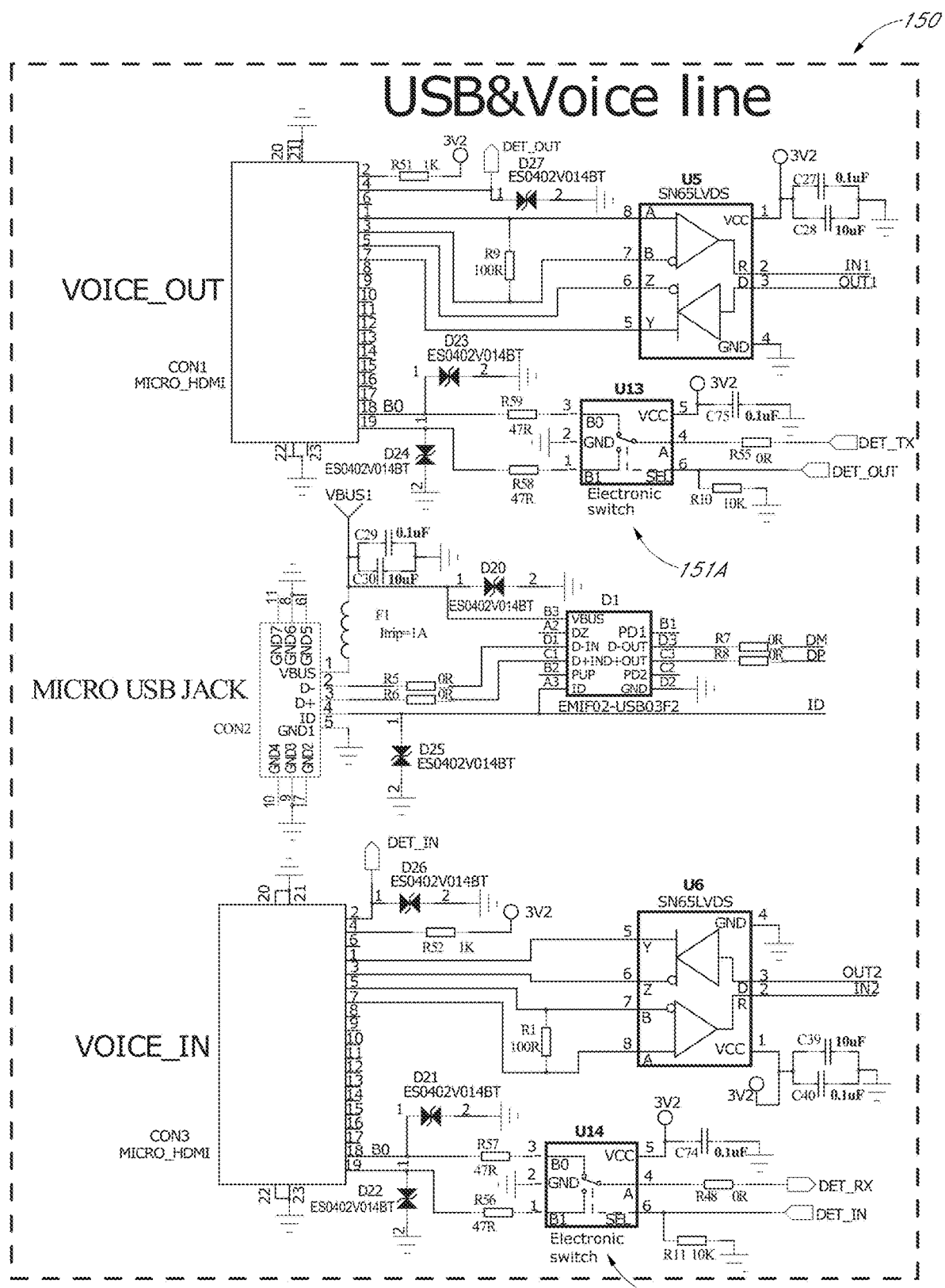
Figure 11:
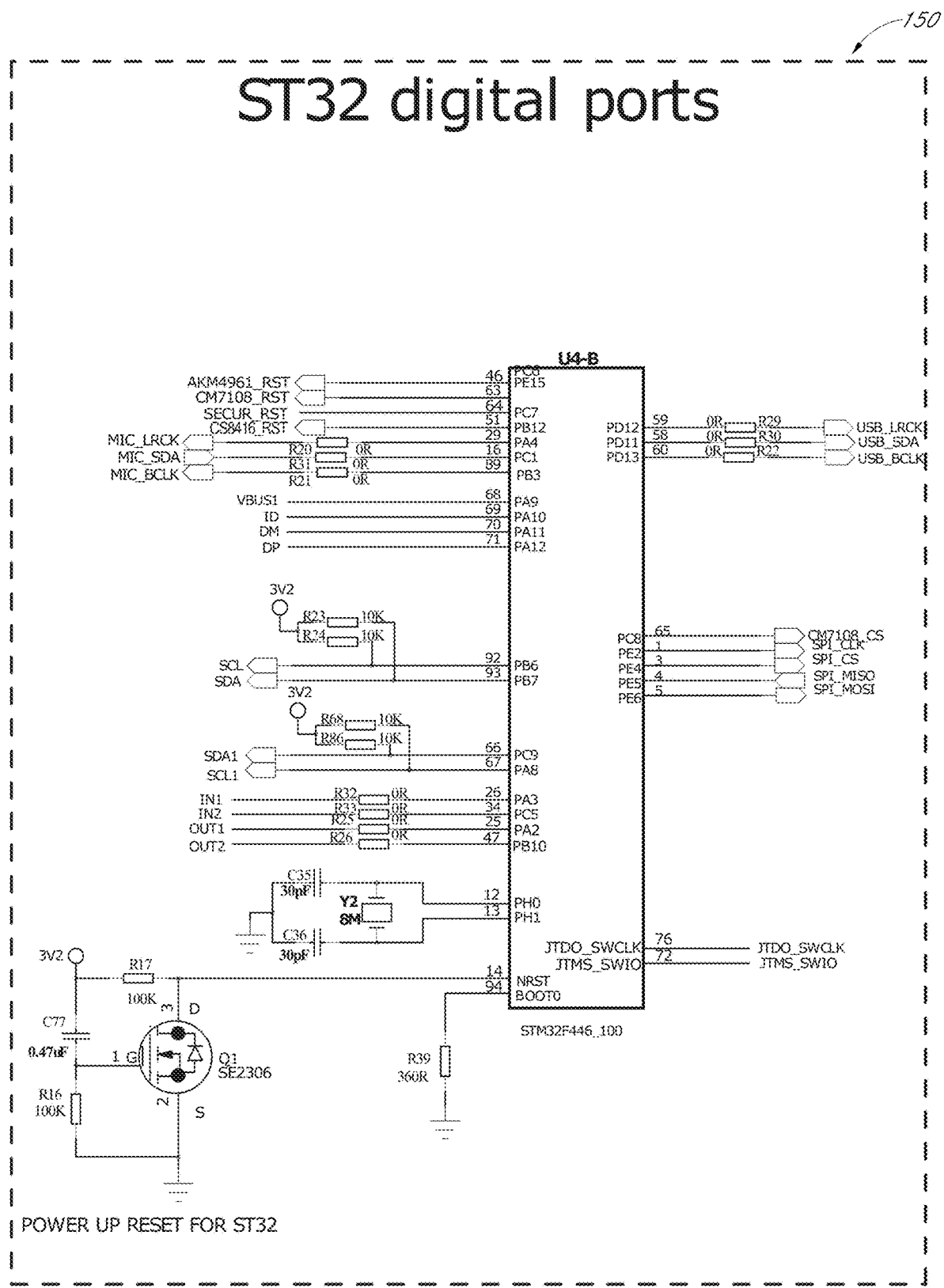
Figure 11:
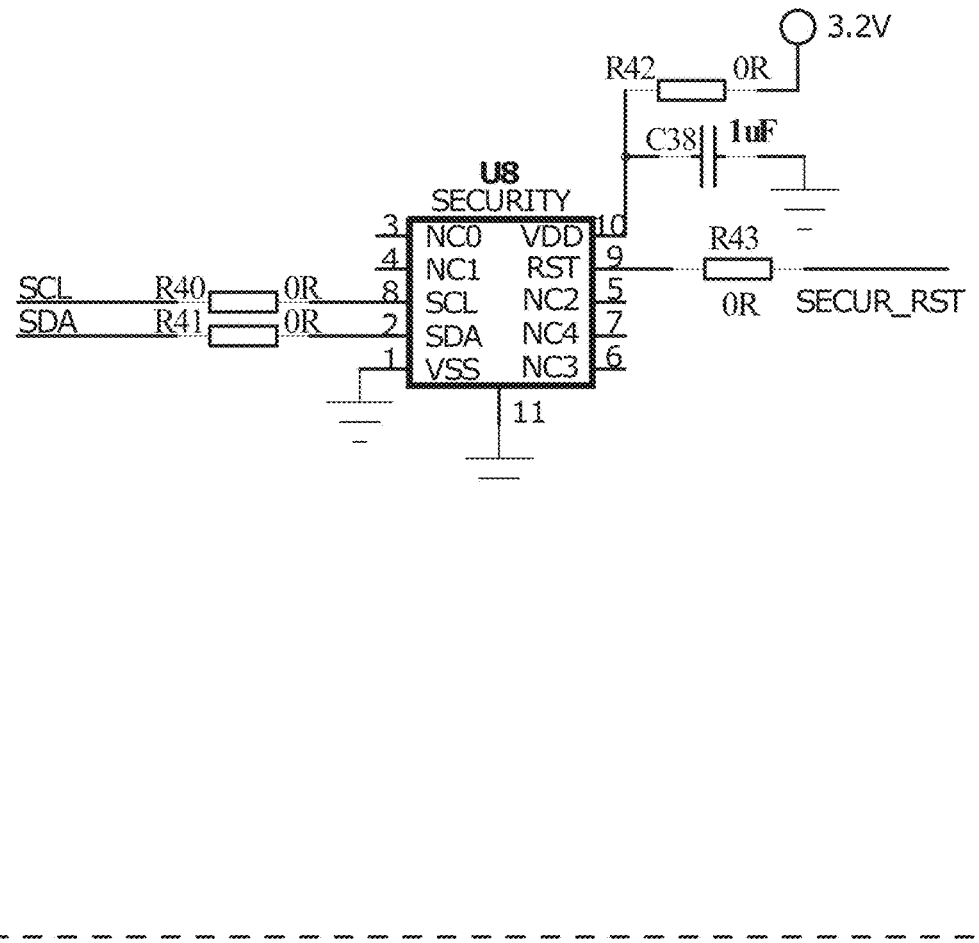
Figure 11:
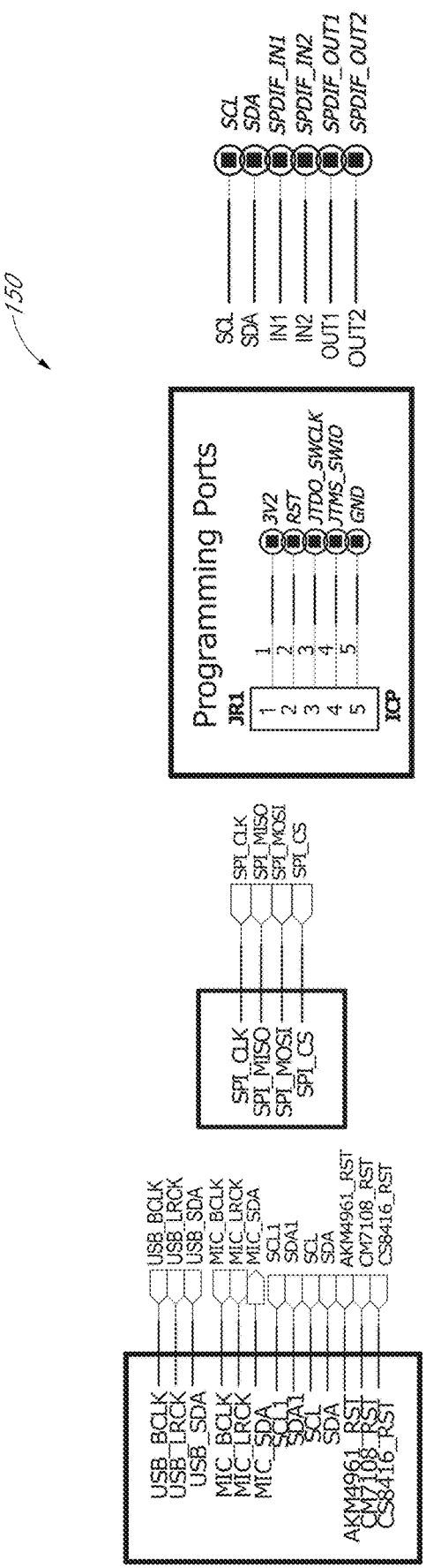
Figure 12:
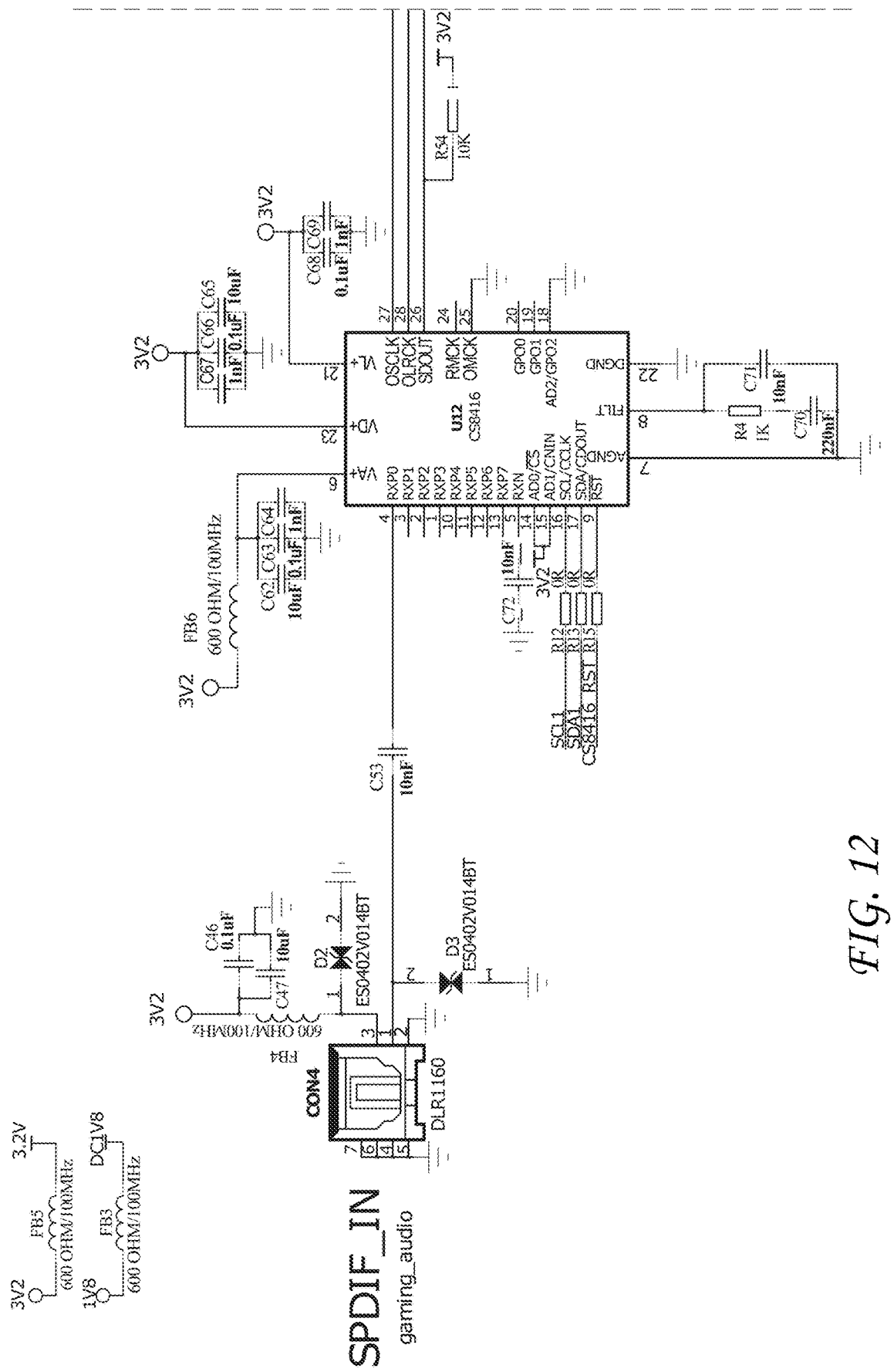
Figure 12:
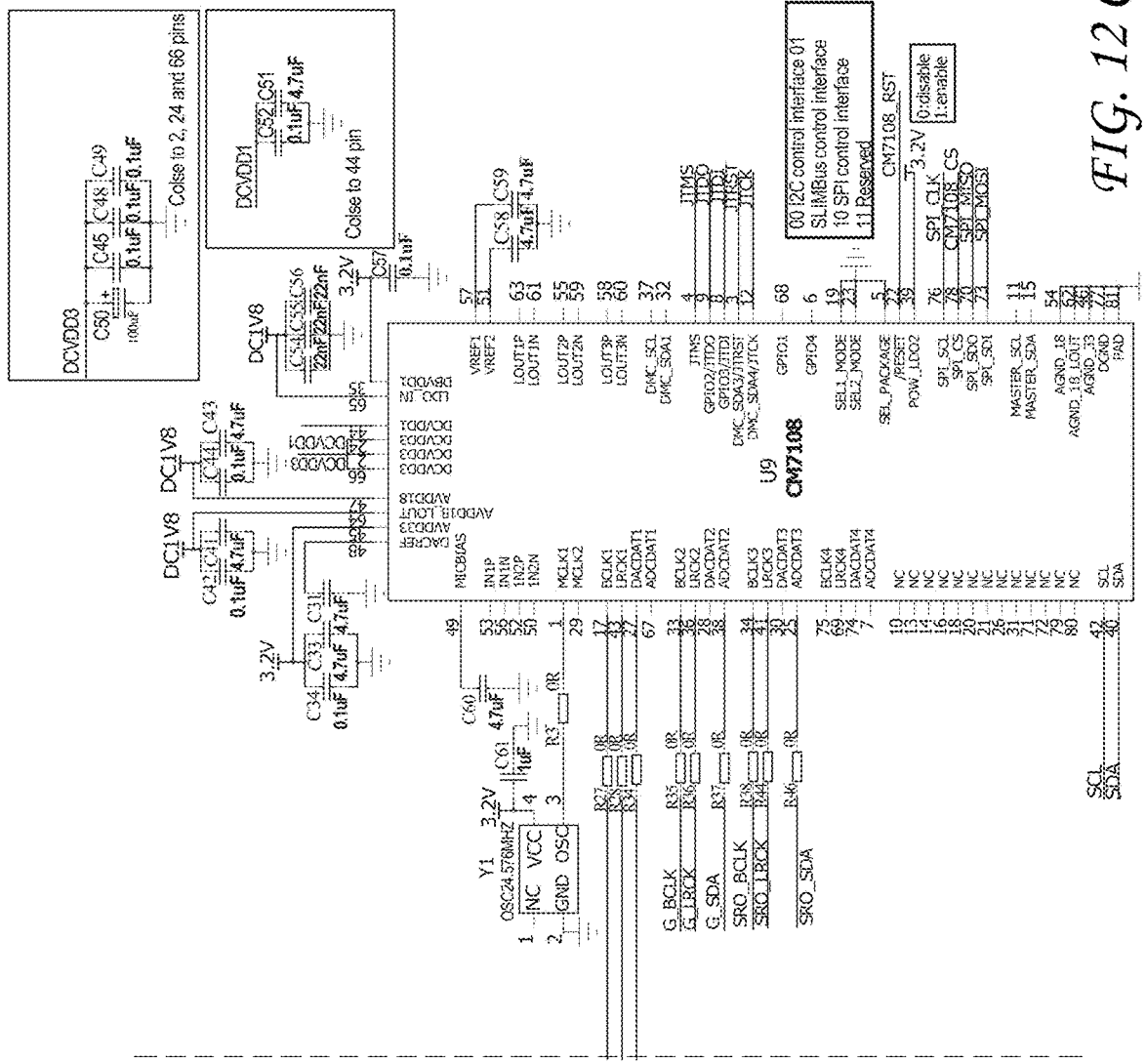
Figure 12:
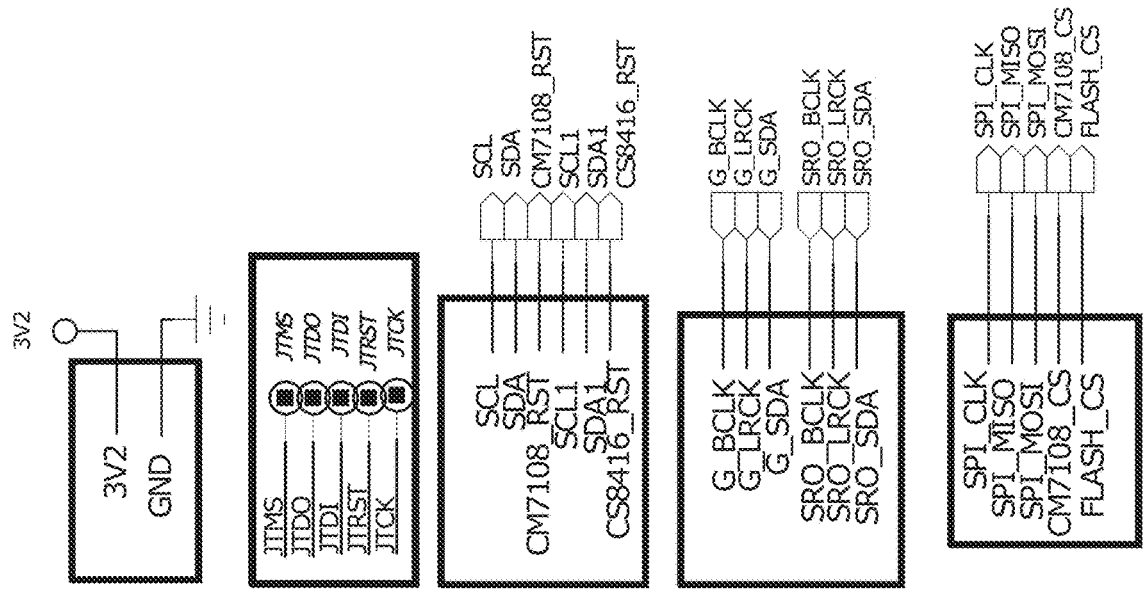
Figure 12:
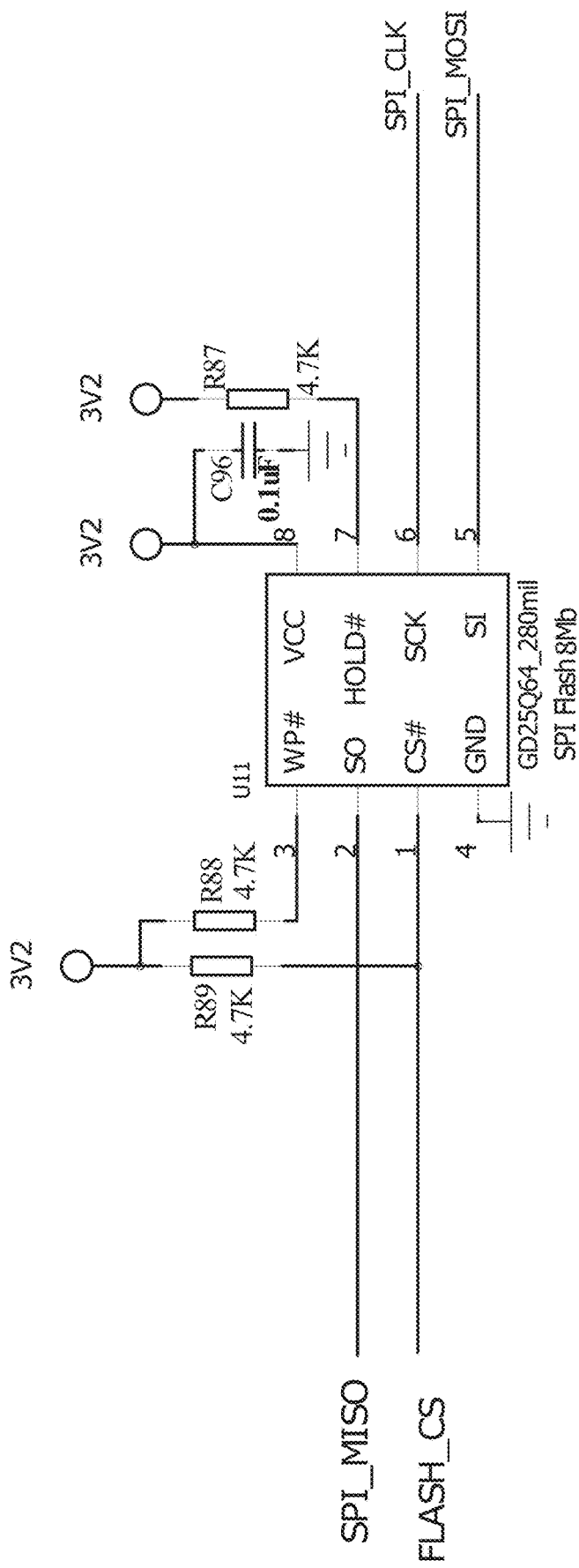
Figure 13:
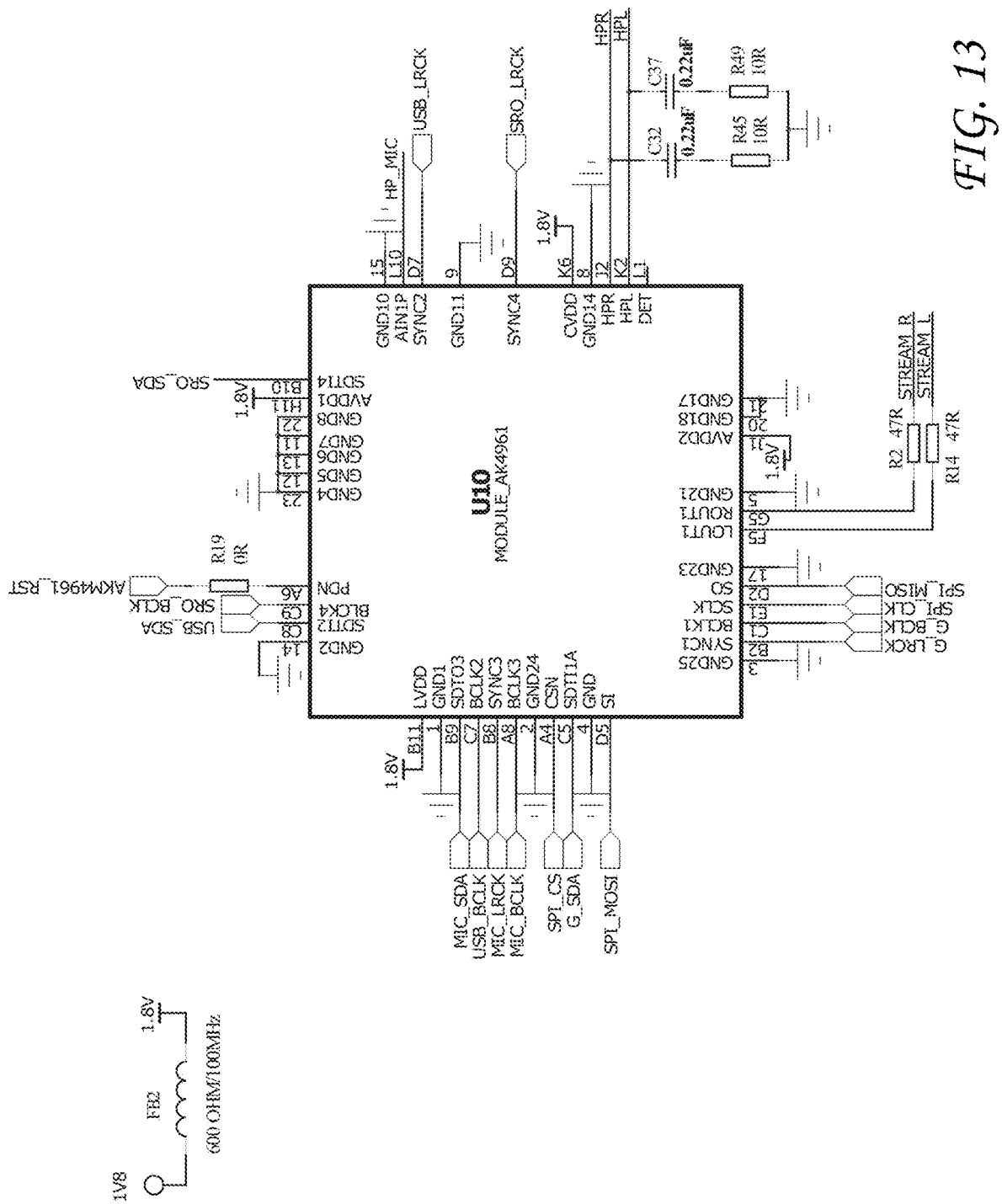
Figure 13:
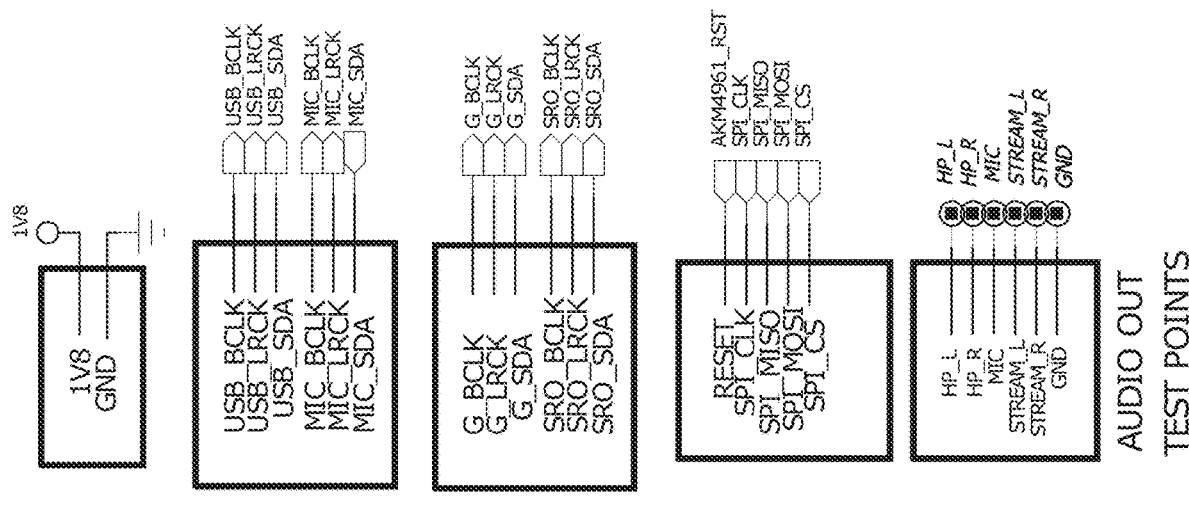
Figure 14:
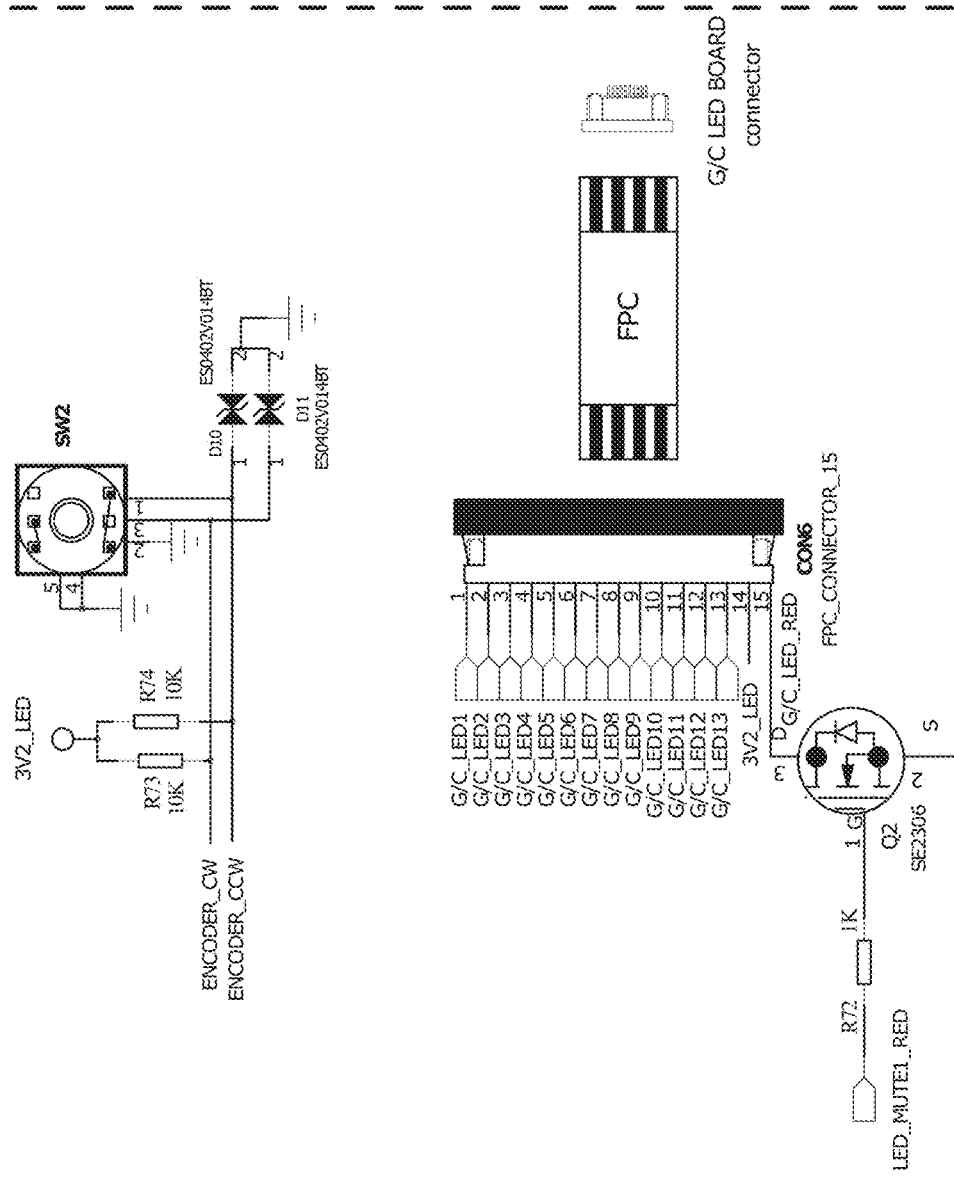
Figure 14:
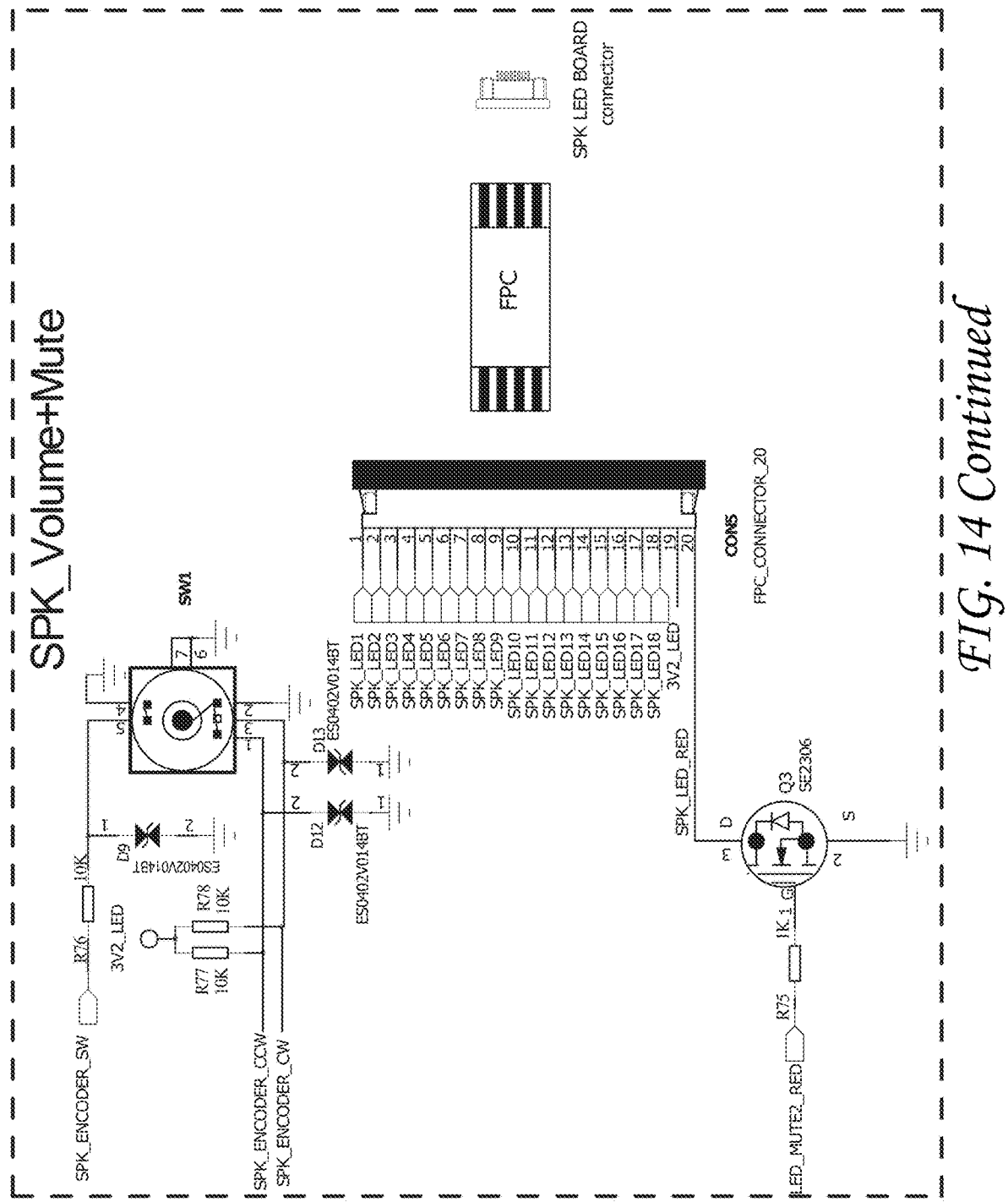
Figure 14:
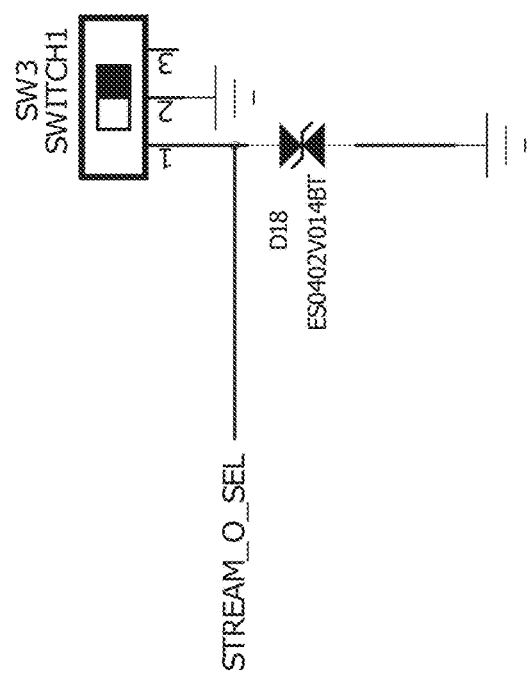
Figure 14:
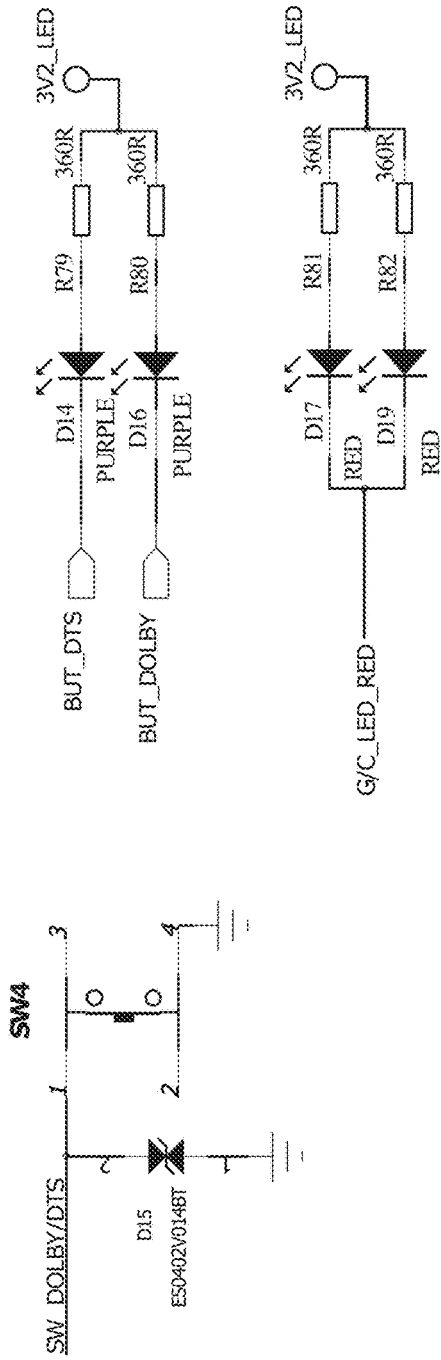

FIG. 9 illustrates a power block diagram for the controller 100. FIG. 10 illustrates power supply circuit diagrams for the controller 100. FIG. 11 illustrates circuit diagrams of the MCU 150. The MCU 150 can optionally have two electronic switches 151A, 151B that operate as further described below. FIG. 12 illustrates circuit diagrams for the audio processor 154 and audio receiver 156. FIG. 13 illustrates circuit diagrams for the audio CODEC 152. FIG. 14 illustrates circuit diagrams for other features of the controller 100, including the volume control 102 and the game/chat audio control 104.

Figure 15:
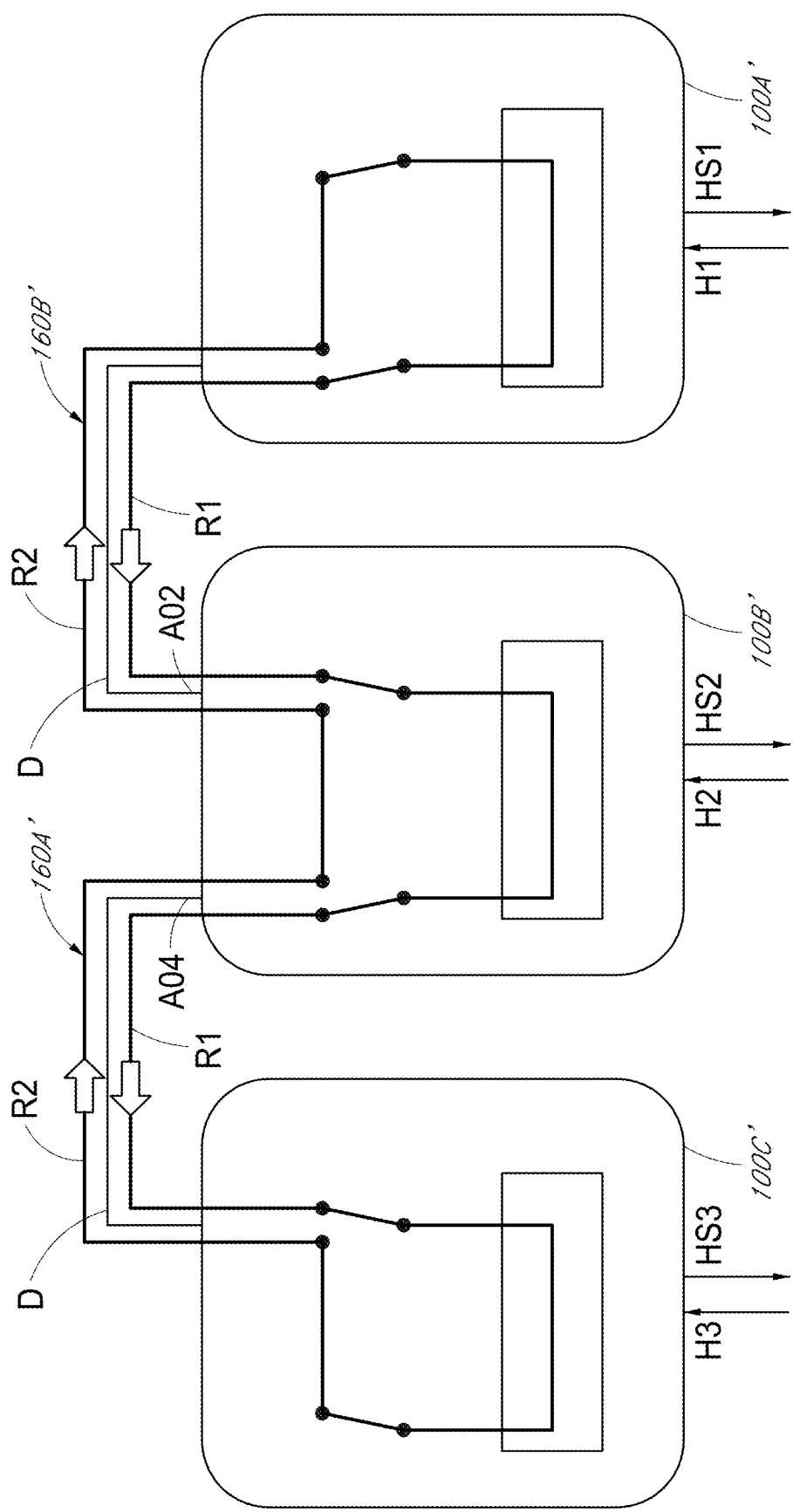
FIG. 15 is a schematic diagram of multiple video game audio controllers connected to teach other in a loop.

FIG. 15 shows a schematic view of multiple gaming audio controllers 100A'-100C' connected by cables 160A'-160B' in a bi-directional manner as described below. The controllers 100A'-100C' are connected to headsets HS1-HS3, respectively. In the illustrated embodiment, the voice audio signal flows in a bi-directional manner between adjacent controllers via one or more wires D in the cables 160A'-160B'. Additionally, the cables 160A'-160B' have a command/data line R1, R2 separate from the one or more wires D that carry the voice signal. The command/data line R1, R2 defines a loop between the controllers 100A'-100C'. The command/data line R1, R2, when the interconnect cables 160A', 160B' are connected to the controllers 100A'-100C', is detected by the MCU 150 in each of the controllers 100A'-100C'. When the command/data line R1, R2 is detected, the MCU 150 utilizes the switches 151A, 151B to define the loop for the command/data line R1, R2, which enables the chat/voice signal to pass audio to the adjacent controller (e.g., from controller 10B' to controllers 100A, 100B', etc.). When only one side of the controller is plugged in (e.g., controller 100A', 100C'), the MCU 150 detects that it is either the first or the last controller in the chain and one or both of the switches 151A, 151B are actuated to compete the loop for the command/data line R1, R2. Once the MCU 150 detects the command/data line R1, R2 (e.g., the connection of the cables 160A'-160B' to the controller 100B'), the firmware (e.g., in the controller 100B') enables the chat/voice signal to pass to the controller for which the command/data line R1, R2 signal was detected. When the loop is not completed, the chat/voice signal is not enabled to pass. Notably, the chat/voice signal does not pass via or through the switches 151A, 151B.

Each controller 100A'-100C' has control circuitry (e.g., such as that shown in FIGS. 8-14) that enable it to: a) sum its headset audio signal (e.g., H2) with a chat audio signal (e.g., A02) from a previous controller (if connected thereto) to provide a first combined audio signal and communicate the first combined audio signal to a next controller (if connected thereto), b) sum its headset audio signal (e.g., H2) with a chat audio signal (e.g., A04) from the next controller (if connected thereto) to provide a second combined audio signal and communicate the second combined audio signal to the previous controller (if connected thereto), and c) sum the chat audio signals from the previous controller (if connected thereto) and the next controller (if connected thereto) to provide a third combined audio signal and communicate the third combined audio signal to the headset (e.g., HS2). In each of these operations, the control circuitry is summing only two audio signals (e.g., summing two chat signals to provide to the headset, summing a chat audio signal and a headset audio signal to provide to another controller). Though FIG. 15 shows three controllers 100A'-100C' connected in the local chat network, one of skill in the art will recognize that the local chat network can have fewer (e.g., 2) or more (e.g., 4, 5, 6, 10, etc.) controllers to accommodate any number of players.

Advantageously, the interconnect cables 160A'-160B' can be bi-directional to allow the audio signal to flow in both directions, as shown schematically in FIG. 15. The local chat network ports 112 can optionally have a dedicated signal pin that electrically connect to the dedicated one or more wires D that carry the audio signal in the interconnect cables 160A'-160B' and electrically connect to a trace pattern, e.g., in the PCB of each controller 100A'-100C', to provide a continuous path from the first controller 100A' to the last controller 100C'. The circuitry in the controllers 100A'-100C' can therefore route the audio signal bi-directionally between the controllers 100A'-100C without requiring an external cable that connects these controllers 100C', 100A' (such as the one shown in embodiment in FIG. 7

In use, several gaming audio controllers, such as controllers 100, 100A'-100C', one for every gamer, can be connected together with interconnect cables 200, 160A-160C, 160A'-160C'. A headset HS, one for every gamer, can be connected to each of the controllers 100, 100A'-100C'. The video game console, such as console C1, C2, can be connected to the controllers 100, 100A'-100C' (e.g., each of the controllers 100, 100A'-100C' can be connected to a separate videogame console). Each of the gamers can individually operate the master volume control input 102 on their controller to vary the speaker volume in their headset HS (such as by rotating a dial until the desired volume is reached), and can also individually operate the game/chat audio control input 104 to vary (e.g., balance) how much game audio and how much chat audio they hear via their headset HS; the more game audio is desired, the less chat audio will be heard and vice-versa. The controllers 100, 100A'-100C' can be connected to each other in any number (e.g., 2 controllers connected together, 3 controllers connected together, 4 controllers connected together, etc.). Optionally, an individual gamer can use the controller 100, 100A' when paying by themselves (e.g., via the internet with other gamers), so that the controller 100, 100A' can be used individually as well as with a group of gamers. Further, as discussed above, each gamer can optionally actuate the broadcast switch 119 on his controller 100, 100A' to allow streaming of their chat audio with or without game audio.

Figure 16B:
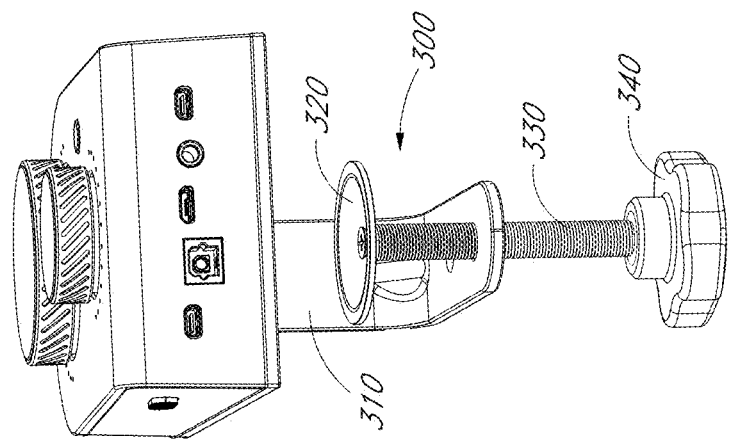
FIGS. 16A-16B show the video game audio controller attached to a mounting clamp.
Figure 16A:
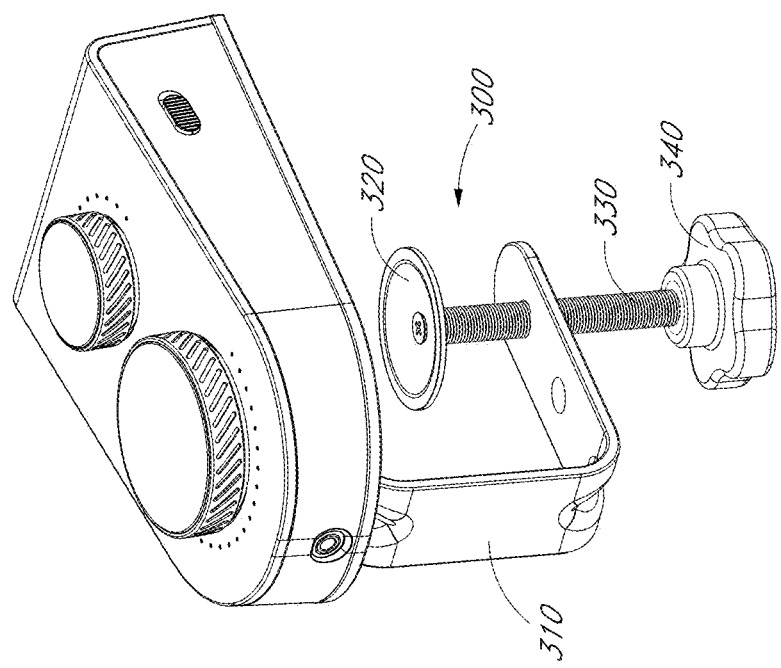
Figure 17F:
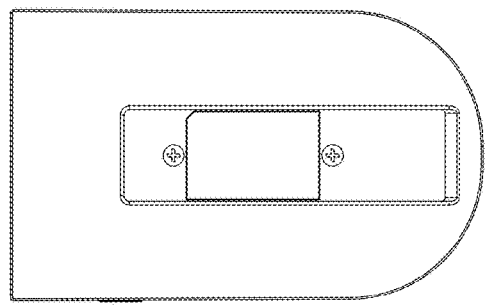
FIGS. 17A-17F show a top, left, front, right and back view, respectively, of a video game audio controller, according to one embodiment.
Figure 17B:
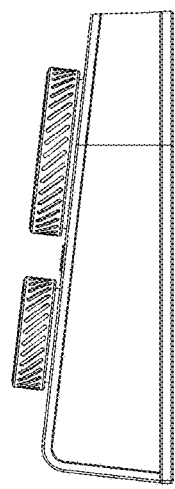
Figure 17D:
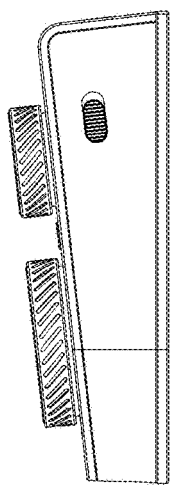
Figure 17E:
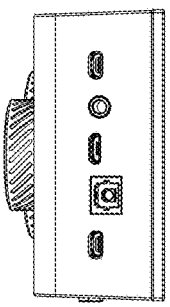
Figure 17A:
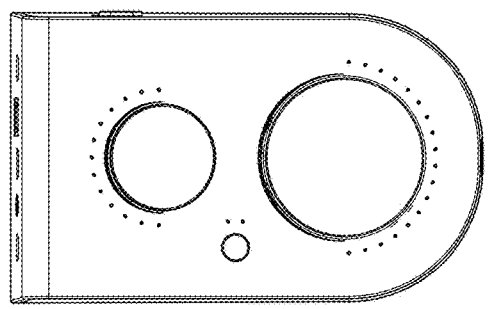
Figure 17C:
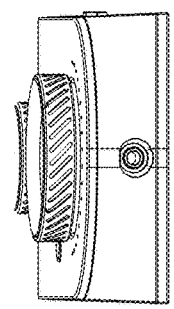

FIG. 16A-16B show the video game controller 100 attached to a clamp assembly 300 for coupling the controller 100 (e.g., to a table top) to substantially fix the position of the controller 100. The clamp assembly 300 can have a body 310 that can optionally be C-shaped or L-shaped. The assembly 300 can also have an adjustable base 320 attached to a screw 330. The height of the base 320 relative to a bottom of the controller 100 can be adjusted, for example by rotating the screw 330 relative to the body 310. Optionally, the assembly 300 can have a rotatable handle or dial 340 coupled to the screw 330 to facilitate rotation of the screw 330 to adjust the height of the base 320. Alternatively, a lever can be coupled to the screw 330 instead of the dial 340. The assembly 300 can be clamped about a support member (e.g., table top) to fix the location of the controller 100 during use and inhibit movement of the controller 100 during use, such as due to inadvertent contact from the user with the controller 100.

FIGS. 17A-17F show a top, left, front, right and back view, respectively, of a video game audio controller, such as the video game controller 100, 100A'-100C', according to one embodiment.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the invention need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed containers.

What is claimed is:

1. A video game audio control system, comprising:
   a video game audio controller, comprising
      a first port configured to connect to an audio headset and receive a headset audio signal therefrom;
      a second port configured to operatively connect to a second video game audio controller and configured to receive a first chat audio signal and a first command signal from the second video game audio controller when connected thereto;
      a third port configured to operatively connect to a third video game audio controller and configured to receive a second chat audio signal and a second command signal from the third video game audio controller when connected thereto;

a fourth port configured to operatively connect to a video game console and configured to receive a game audio signal from the video game console when connected thereto; and control circuitry configured to detect the first command signal indicative of an operative connection with the second video game audio controller, and configured to detect the second command signal indicative of an operative connection with the third video game audio controller, the control circuitry configured to actuate one or more electronic switches based on said detection of the command signals, the control circuitry further configured to sum the headset audio signal and the first chat audio signal to provide a combined voice signal, wherein the control circuitry is configured to communicate the combined voice signal to the third controller via the third port without said combined voice signal passing through the one or more electronic switches if the second command signal is detected by the control circuitry, and wherein the control circuitry is configured to not communicate the combined voice signal via the third port if the second command signal is not detected.

2. The system of claim 1, wherein the control circuitry sums the game audio signal with the combined voice signal to provide an output audio signal that is communicated to the third video game audio controller via the third port.

3. The system of claim 1, wherein the video game audio controller further comprises a master volume control input selectively actuatable by a user to vary a volume of a combined game audio signal and first chat audio signal.

4. The system of claim 1, wherein the video game audio controller further comprises a chat and game audio control input selectively actuatable by a user to vary a volume level of the first chat audio signal relative to a volume level of the game audio signal.

5. The system of claim 1, further comprising the second video game audio controller and an interconnect cable configured to connect to the second port and to a port of the second video game audio controller, the interconnect cable comprising a wire that transmits the first command signal to the second port and a separate wire that transmits the first chat audio signal to the second port from the second video game controller.

6. The system of claim 5, further comprising the third video game audio controller and a second interconnect cable configured to connect to the third port and to a port of the third video game audio controller, the second interconnect cable comprising a wire that transmits the second command signal to the third port and a separate wire that transmits the combined chat audio signal from the third port to the third video game controller.

7. The system of claim 6, wherein the separate wire additionally transmits the second chat audio signal from the third video game controller to the third port, the control circuitry configured to sum the headset audio signal and the second chat audio signal to provide a second combined voice signal, and to communicate the second combined voice signal to the second video game audio controller via the second port without said second combined voice signal passing through the one or more electronic switches.

8. The system of claim 7, wherein the control circuitry is configured to sum the first and second chat audio signals to provide a third combined voice signal and to communicate the third combined voice signal to the audio headset via the first port.

9. The system of claim 6, wherein the interconnect cable and second interconnect cable are HDMI cables.

10. The system of claim 2, further comprising a broadcast switch actuatable to stream out a combined chat voice signal defined by a sum of the headset audio signal, first chat audio signal and second chat audio signal, or the combined chat voice signal in combination with the game audio signal.

11. A video game audio control system, comprising:

a plurality of video game audio controllers removably connectable with each other in a chain via one or more interconnect cables to define a local chat audio network, each of the video game audio controllers comprising a headset audio port configured to connect to an audio headset and receive a headset audio signal, a left chat audio port configured to receive a first chat audio signal and a first command signal from a previous video game controller in the chain when connected thereto, a right chat audio port configured to receive a second chat audio signal and a second command signal from a next video game controller in the chain when connected thereto, a game audio port configured to operatively connect to a video game console and configured to receive a game audio signal from the video game console when connected thereto, and control circuitry configured to detect the first command signal indicative of a connection with the previous video game audio controller, and configured to detect the second command signal indicative of a connection with the next video game audio controller, the control circuitry configured to actuate one or more electronic switches based on said detection of the command signals, the control circuitry further configured to sum the headset audio signal and the first chat audio signal to provide a first combined voice signal, configured to sum the headset audio signal and the second chat audio signal to provide a second combined voice signal, and configured to sum the first and second chat audio signals to provide a third combined voice signal, wherein the control circuitry communicates the first combined voice signal to the right chat audio port without said first combined voice signal passing through the one or more electronic switches if the second command signal is detected by the control circuitry indicating a connection with the next video game controller.

12. The system of claim 11, wherein the control circuitry is configured to communicate the second combined voice signal to the left chat audio port without said second combined audio signal passing through the one or more electronic switches if the first command signal is detected by the control circuitry indicating a connection with the previous video game controller.

13. The system of claim 11, wherein the one or more interconnect cables are HDMI cables.

14. The system of claim 11, wherein each of the one or more interconnect cables comprises a wire that transmits one of the first and second command signals and a separate wire that transmits one of the first and second chat audio signals.

15. The system of claim 11, wherein the control circuitry sums the game audio signal with the first combined voice signal to provide an output audio signal that is communicated to the next video game audio controller via the third port.

16. The system of claim 15, wherein each of the video game audio controllers further comprises a broadcast switch actuatable to stream out a combined chat audio signal defined by a sum of the headset audio signals of the plurality of video game audio controllers or the combined chat audio signal in combination with the game audio signal.

17. The system of claim 15, wherein each video game audio controller further comprises a master volume control input selectively actuatable by a user to vary a volume of the output audio signal.

18. The system of claim 11, wherein the control circuitry communicates the third combined voice signal to the headset audio port, each video game audio controller further comprising a chat and game audio control input selectively actuatable by a user to vary a volume level of the third combined voice signal relative to a volume level of the game audio signal.

* * * * *